(12) United States Patent
Munshi et al.

(10) Patent No.: US 7,150,938 B2
(45) Date of Patent: Dec. 19, 2006

(54) STRUCTURALLY EMBEDDED INTELLIGENT POWER UNIT

(75) Inventors: M. Zafar A. Munshi, Missouri City, TX (US); Alfred J. Longhi, Jr., Alvin, TX (US)

(73) Assignee: Lithium Power Technologies, Inc., Manvel, TX (US)

( * ) Notice: Subject to any disclaimer, the term of this patent is extended or adjusted under 35 U.S.C. 154(b) by 445 days.

(21) Appl. No.: 10/107,565

(22) Filed: Mar. 27, 2002

(65) Prior Publication Data

US 2003/0038610 A1    Feb. 27, 2003

Related U.S. Application Data

(60) Provisional application No. 60/280,087, filed on Mar. 30, 2001.

(51) Int. Cl.
*H01M 10/02*    (2006.01)

(52) U.S. Cl. ........................... 429/162; 429/120

(58) Field of Classification Search ............. 429/111, 429/120, 162
See application file for complete search history.

(56) References Cited

U.S. PATENT DOCUMENTS

| | | | |
|---|---|---|---|
| 3,928,960 A * | 12/1975 | Reese ..................... 708/111 |
| 4,740,431 A | 4/1988 | Little |
| 5,025,202 A * | 6/1991 | Ishii et al. ............... 320/101 |
| 5,113,659 A | 5/1992 | Baker et al. |
| 5,180,645 A | 1/1993 | Moré |
| 5,270,636 A * | 12/1993 | Lafferty ................. 320/101 |
| 5,289,998 A | 3/1994 | Bingley et al. |
| 5,372,183 A | 12/1994 | Strickberger |
| 5,401,329 A | 3/1995 | Fraas et al. |
| 5,456,000 A | 10/1995 | Gozdz et al. |
| 5,593,509 A | 1/1997 | Zuppero et al. |
| 5,626,976 A | 5/1997 | Blanton et al. |
| 5,637,421 A | 6/1997 | Poehler et al. |
| 5,644,207 A | 7/1997 | Lew et al. |
| 5,695,885 A | 12/1997 | Malhi |
| 5,763,118 A | 6/1998 | Stafford et al. |
| 5,786,107 A | 7/1998 | Stafford et al. |
| 5,793,184 A * | 8/1998 | O'Connor ............... 320/101 |
| 5,811,958 A * | 9/1998 | Yamamoto ............... 320/101 |
| 5,932,994 A * | 8/1999 | Jo et al. .................. 323/222 |
| 5,963,417 A * | 10/1999 | Anderson et al. ........ 361/503 |
| 6,119,979 A | 9/2000 | Lee et al. |
| 6,224,016 B1 | 5/2001 | Lee et al. |

(Continued)

FOREIGN PATENT DOCUMENTS

| WO | WO 01/17051 | 3/2001 |
|---|---|---|
| WO | WO 01/17052 | 3/2001 |

OTHER PUBLICATIONS

S. Licht, "High Efficiency Solar Cells," *The Electrochemical Soc. Interface* 6 (3):34-39 (1997).

*Primary Examiner*—Mark Ruthkosky
(74) *Attorney, Agent, or Firm*—Conley Rose, PC

(57) ABSTRACT

An electrical power system for a spacecraft or other vehicle or structure comprising a structural member containing an integrated solid-state power source is disclosed. The power source includes a solar cell system and an energy storage system that are combined into a single unit or package, and in certain embodiments, are configured into the shape of a flexible aerobot balloon or a rigid nanosat surface panel. The power components of a preferred lightweight power unit, include thinly layered photovoltaic cells, a rechargeable lithium solid polymer electrolyte battery, a capacitor, electronics and thermal management capability.

52 Claims, 10 Drawing Sheets

U.S. PATENT DOCUMENTS 6,316,145 B1 * 11/2001 Kida et al. ............... 429/231.5
6,426,861 B1    7/2002 Munshi
6,426,863 B1    7/2002 Munshi
6,462,507 B1 * 10/2002 Fisher, Jr. .................. 320/101
6,608,464 B1    8/2003 Lew et al.
6,619,028 B1    9/2003 Kreiner et al.
6,673,254 B1    1/2004 Marshall et al.
6,805,998 B1 * 10/2004 Jenson et al. ............... 429/162
6,924,164 B1 *  8/2005 Jenson ........................ 438/48

* cited by examiner

STRUCTURALLY EMBEDDED INTELLIGENT POWER UNIT

CROSS-REFERENCE TO RELATED APPLICATIONS

This application claims the benefit under 35 U.S.C. § 119(e) of U.S. Provisional Patent Application No. 60/280,087 filed Mar. 30, 2001.

BACKGROUND OF THE INVENTION

1. Field of the Invention

The present invention generally relates to integrated solid state electrical power sources and to structures and vehicles containing such integrated power sources embedded in or formed as a structural member. More particularly, the invention relates to solar power systems containing flexible integrated photovoltaic solar cells and advanced energy storage systems in which ultra thin-film batteries, capacitors and other components are formed as a single unit and embedded into a supporting or covering element of a structure.

2. Description of Related Art

Integrated Power Sources. Several integrated electrical power sources have been devised over the past two decades for a variety of applications, and in some cases a battery and/or a solar photovoltaic collection device has been integrated or embedded into a support or covering for a structure or device. The term "integrated power source" refers to a power source that is structurally combined as a single unit. For example, U.S. Pat. No. 4,740,431 describes an integrated solar cell and battery primarily for use in portable electronic devices such as radio transceivers, portable computers and emergency lights, as integrated power generation and storage modules. Thin film lithium-aluminum alloy anodes, polyethylene oxide/lithium salt solid electrolyte, and a molybdenum selenide cathode are described as exemplary battery components and the solar cells may contain amorphous silicon.

U.S. Pat. No. 5,626,976 describes a certain flexible energy storage device with integral charging unit (photovoltaic device). Conventional aqueous or non-aqueous electrolyte or polymer gel electrolyte material, or a solid state electrolyte is employed, and enclosed in a polymeric vapor barrier package.

U.S. Pat. No. 5,180,645 describes a certain integral solid state embedded power supply for a self-powered portable electronic product, such as a radio. The elimination of the outside metallic case of each cell and the elimination of the outer packaging for the overall battery provides a considerable reduction in volume and weight of the product.

U.S. Pat. No. 5,644,207 describes a renewable modular integrated power source that is bonded to a housing or structure or is molded into a desired shape using the battery material itself. In one application solar cells backed with a thin film polymer battery supply a lightweight fully integrated power source. Conventional solid state or ionically conducting gel polymer electrolyte batteries, such as that described in U.S. Pat. No. 5,637,421 are employed.

U.S. Pat. No. 5,695,885 describes a battery configured in the form of a flexible wrist band for a watch or personal radio, television or communication device, with a plurality of photovoltaic cells disposed on the outer surface of the battery. Conventional alkaline or Ni—Cd type batteries are described along with presently known flexible anode and cathode materials.

U.S. Pat. No. 6,224,016 describes a flexible energy producing envelope material or covering for a balloon used in high altitude and stratospheric applications. The covering includes a flexible solar cell layer, a flexible substrate that matches the shape and size of the airship gore as well and an electrically conductive conduit disposed in a flexible electrically non-conductive adhesive connecting the flexible solar cell substrate to the airship substrate. No energy storage means is integrated into the covering with the photovoltaic cell layer, however.

For powering satellites, aerobots (balloons) and other spacecraft applications, such as altitude control systems, communications and various payloads, a conventional integrated power system (e.g., solar power system) that might be satisfactory for powering a small, personal device such as a radio or a wristwatch would not be adequate, particularly spacecraft intended for long missions in space.

Space Power Systems. A number of advanced propulsion and energy storage technologies with reduced mass and volume, long service life, higher reliability, thermal and radiation resistant and low cost for use in spacecraft such as satellites, nanosats and aerobots (balloons) are required for future space missions, and for military, surveillance, scientific research and commercial applications. For instance, there is a great need for a longer lasting power source for use in deep space exploration away from the sun, and no suitable power source is presently available using today's technology. In the cryogenic conditions of deep space, aerobots or balloons will require more battery capacity and higher power capabilities in a lightweight design than is presently possible with existing power sources. Typically, nanosats and aerobots call for the incorporation of photovoltaic devices on the surface of panels to charge the auxiliary on-board batteries for a variety of usages. Another application for lightweight sources of electrical energy is in the construction of lightweight high altitude or spaceborne platforms (e.g., for missile defense use).

Further complicating the problem, today's satellite designers continually strive to raise the level of onboard power generation while at the same time endeavoring to lower the cost of such increased power capability. Therefore, satellites that are now envisioned for various future anti-missile roles, for example, have an ever increasing demand for power. Although the goals and operational requirements of satellite missions can vary widely, they are in almost every case constrained by the type, level, and duration of the on-board power source.

Space power systems designed for continuous high-power-output applications have most commonly been based on the use of photovoltaic panels that regenerate the battery. In all orbits, satellites are subjected to a greater or lesser number of eclipses, and thus have to rely on internal energy to continue their missions. This internal energy is provided by rechargeable batteries, which store the surplus energy generated by spacecraft solar arrays. In geosynchronous orbit (GEO), the satellite is in eclipse for only a short time: for approximately 4 months, the satellite is in the sun at all times; for the next 50 days, the satellite is in eclipse for periods up to 72 minutes per day (it builds from 0 minutes to 72 minutes in the first 25 days and then drops down to 0 minutes); then, the satellite is in the sun for approximately 4 months. GEO applications require approximately 100 charge/discharge cycles (C) per year and as such the requirement is not so strenuous. In low earth orbit (LEO) missions, the battery typically provides power for 30 minutes at the 1 C rate, followed by a one hour charge. LEO applications usually require about 6000 cycles per year.

Ni—H$_2$ Batteries. In the past decade, nickel-hydrogen batteries have been the technology of choice for both commercial and defense-related satellites in both GEO and LEO applications. They have inherent advantages over their predecessor nickel-cadmium batteries. These include superior energy density, longer cycle life, and better tolerance to overcharge and reversal. The goal of increasing cell energy density provided the original impetus for the development of the nickel-hydrogen system. In a battery, the useable energy density of a nickel-cadmium battery is typically in the range of 20–35 Wh/kg while that of a nickel-hydrogen battery it is about 40–45 Wh/kg.

Present day satellites can be categorized into four groups: large, small, mini and micro. The large satellites have mass greater than 1000 kg; the small category is 500–1000 kg; the mini in the 100–500 kg range and the micro less than 100 kg. Table 1 shows satellite battery-power systems data for some previous space missions. The power requirements for GEO satellites are in the 10–15 kW range for extremely long-term missions lasting up to 15 years.

TABLE 1

Specifications of Some Previous Satellite Battery-Power Systems

| Satellite | Program | Payload | Satellite Mass (kg) | Array Power (W) | Battery Type | Battery Size (Ah) |
|---|---|---|---|---|---|---|
| HESSI | NASA Small Explorer | Solar Imager | 290 | 505 | Ni—H$_2$ CPV | 15 |
| MightySat 2.1 | AFRL | Research & Imaging | 121 | 330 | NiCd | 10 |
| Deep Space 1 | JPL New Millenium | Adv. Tech. Ion Prop. | 486 | 2500 | Ni—H$_2$ CPV | 30 |
| ARGOS | AF | Experiments | 2100 | 1074 | Ni—H$_2$ IPV | 45 |
| Stardust | NASA Discovery | Sample returns | 380 | | Ni—H$_2$ CPV | 16 |
| NEAR | NASA Discovery | Asteroid Rendevous | 805 | 1800 | Super NiCd | 9 |
| EO-1 | GSFC New Millenium | Earth observations | 529 | 600 | Super NiCd | 50 |
| Terriers | NASA STEDI | Earth atm. observations | 125 | 31 | NiCd | 4.8 |
| HETE-2 | NASA | Gamma ray detection. | 124 | 168 | NiCd | 1.2 |

For longer missions requiring high cycle life and cryogenic operating conditions, low energy density Ni—H$_2$ batteries are now employed. These batteries are not only bulky and constructed in heavy steel pressure vessels, but also offer lower current capabilities. For shorter missions and low cycle life requirements in which high power is required, NiCd batteries are typically used. These batteries and solar panels occupy between 15–25% of the total weight and volume of a present day satellite. The volume of the satellite is a function of the surface area for the solar panels and hence the power availability. They vary from about 90 m$^3$ for satellites weighing over 2000 kg to about 2.5 m$^3$ for those weighing about 35 kg.

Lithium Ion Batteries. Space power systems of the future are projected to require power levels that may extend far beyond the current levels of demand. Thus, there is an increasing need for lightweight, high energy density batteries with long active and cycle lives beyond what can be delivered by nickel-hydrogen batteries. Toward that end, lithium ion battery systems are at this time undergoing intense investigation. For Example, U.S. Pat. No. 5,456,000 describes one type of lithium ion rechargeable battery containing polymeric film composition electrodes and separator membranes. An advantage of a lithium ion battery system is that the useable specific energy is two to three times greater than that of nickel-hydrogen batteries. This represents a significant launch cost savings or increased payload mass capabilities. However, the energy density and cycle life of a conventional lithium ion battery system is typically only about 150 watt hours per kilogram and 500 cycles, respectively, under deep discharge conditions.

Solid Polymer Electrolyte Batteries. Commonly assigned U.S. Pat. Nos. 6,645,675 and 6,664,006, and PCT International Publication Nos. WO 01/17051 and WO 01/17052 describe all-solid-state electrochemical cells and batteries with a flexible, ionically conductive polymer membrane as the electrolyte For example, a rechargeable all-solid-state lithium polymer electrolyte battery comprises an ultra thin lithium anode, which may be either a metallic lithium element or a lithium metal layer about 0.1 to 100 microns thick, over the metallization layer of a metallized polymer substrate. The metallized polymer substrate has an inactive polymer layer about 0.5 to 50 microns thick and a metallization layer 0.1–1µ thick on top of the inactive polymer layer. This battery also has an ultra thin-film cathode layer containing a metallized polymer substrate. The metallized polymer substrate has an inactive polymer layer about 0.5 to 50 microns thick and a metallization layer about 0.01–1µ thick on top of the inactive polymer layer, and has a layer of active cathode material 0.1–100µ thick on top of the metallization layer. The battery also has a polymer electrolyte layer 0.2–100µ thick placed between the above-described anode and cathode layers. This polymer electrolyte has a conductivity greater than $1 \times 10^{-4}$ S/cm at 25° C., or may even conduct as well below 25° C. The polymer electrolyte comprises a mixture of a base polymer material comprising at least one ionically conductive polymer and having an initial conductivity of at least about $1 \times 10^{-5}$ S/cm at 25° C. when combined with a lithium salt. The mixture also includes the lithium salt, an inorganic filler having an average particle size <0.05 micron in diameter and a surface area of at least about 100 m$^2$/g, and a lithium ion conducting material having an average particle size <0.1 micron in diameter and an initial ionic conductivity of at least $2 \times 10^{-3}$ S/cm at 25° C. In some embodiments, the inorganic filler is 0.1–20% (by volume of solid polymer electrolyte) high surface area filler having an average particle size $\leq 0.01$ micron and chosen from the group consisting of fumed silica and alumina. In some embodiments, the lithium ion conductor material is 0.1–80% sulfide glass (by volume of solid polymer electrolyte). In some embodiments, the lithium ion conductor material is a ceramic ion conductor chosen from the group consisting of lithium beta alumina and silicates. Ion mobility is achieved through coordination of electrolyte ions by sites on the polymer chain, thus promoting electrolyte dissolution and salt dissociation. Such a battery design overcomes the disadvantages inherent in liquid electrolytes and provides better long-term storage stability. By also employing thin, flexible electrodes, such batteries can be made into virtually any shape and size, are reasonably rugged and leakproof, have high specific energy (Wh/kg) (gravimetric) and energy density (Wh/L) (volumetric), high cycle life, low self-discharge, high current drain capability, lower resistance, and wider operating temperature range.

Two major factors that drive satellite design are launch costs per kilogram of satellite and instruments and power availability. Since small and moderate mission costs can run from $100 million to greater than $1 billion, reliability, efficiency, and density of power in the satellite design and components is necessary. Moreover, future satellites for missile defense applications will require not only greater longevity from the power source but also higher power, lower weight and volume, greater degree of power management, and significantly lower cost, so that more firepower can be packed into these satellites. Other applications such as surveillance, deep space exploration or terrestrial use will have similar requirements. The existing space power technologies are only capable of providing power sources that are rigid, bulky, heavy and costly, and which are monofunctional, i.e., they serve as a power source only. Present day satellites also need, in addition to the power source components, a special 'skin' enclosure that is sturdy enough to protect the power source from the sun's heat and from space debris. This is necessary since the conventional batteries contain a liquid electrolyte that can evaporate away at high heat or cause a dangerous situation. At the same time, the electrodes need to be contained in a rigid environment to prevent them from disintegrating due to constant bombardment by space debris. Furthermore, the conventional liquid electrolyte batteries, and even the newer lithium ion batteries, do not provide satisfactory high current drain capabilities for use in many of the latest applications being developed, such as anti-missile systems, aerobots or balloons for planetary exploration.

Another problem with existing photovoltaic systems is that the solar cells at optimum levels of performance get hot, which reduces the efficiency. Solar cells operate better at cooler temperatures.

Despite the technological advancements provided by prior art devices, known integrated power sources still suffer from limitations of excessive size and weight, lack of sufficient flexibility or conformability, insufficient power density (watts/volume) and specific power (watts/weight), particularly for use in the new and future high altitude and space-related military programs, for space exploration, and for various other scientific research and commercial applications.

BRIEF SUMMARY OF PREFERRED EMBODIMENTS

The present invention overcomes many of the shortcomings of power source technologies presently available for use in space exploration and earth orbital operations. In accordance with certain embodiments of the present invention, an electrical power system for a structure is provided which comprises a structural member containing at least one integral solid-state power unit. The terms "integral or integrated solid-state power unit" means that the component parts of the power unit are laminated together or formed as a single unit. The integrated power unit is preferably embedded or integrated into a structural member (e.g., a truss, housing, or structural panel) of a spacecraft, vehicle, building, apparatus or other structure, or the laminated power unit itself is configured as a dual or multi-functional structural member for use in constructing or assembling a structure as well as serving as a power source for the structure. The structurally integrated power units disclosed herein are not limited to merely wrappings or coatings for structural members, in contrast to previously existing power units that are sometimes referred to as being integral to a structure. The new integrated or embedded power unit is sometimes called a Structurally Embedded Intelligent Power Unit ("SEIPU") in this disclosure. For example, a lightweight structural panel comprising an integrated solid-state power source may be configured in the shape of a balloon, nanosat, satellite or air/space platform building material in which the laminated components of a solar power system, including photovoltaic solar cells), and advanced energy storage system, including batteries and capacitors, and auxiliary devices such as heaters, microelectronics and cooling elements, are directly embedded into the structural panels of the satellite, or configured into the shape of the balloon structure. Benefits of using a SEIPU instead of a conventional power unit for such structures include increased capacity and high power capability of the system, both of which features have not previously been available simultaneously in the same satellite. As discussed further in the Detailed Description of Preferred Embodiments, SEIPU-containing systems allow greater latitude in power management and provide reliable power under a wide range of conditions, reduce the weight of the satellite, or other structure, and provide improved charged acceptance capability.

The term "solid-state" as used herein generally means non-liquid containing. A solid-state polymer electrolyte device can contain a small or limited amount of non-aqueous liquid electrolyte, preferably no more than about 30 wt. %, entrapped in a polymer. Accordingly, the term "solid-state" can also refer to devices that contain a soft or gel-like semi-solid polymer component.

Accordingly, in certain embodiments the power unit provides structural support for a structure, and in some embodiments the structural member is an interior support in a structure, such as a truss framework of a satellite. In certain embodiments the power unit is conformable to the shape of the structural member. In some embodiments the power unit is laminated onto a preexisting structural member, or constituent part of a structure. In some embodiments the structural member comprises a panel, or a group of interlockable modular panels, in which the power unit is embedded.

In certain embodiments the power system comprises a laminate of the following components: at least one thin film photovoltaic cell, optionally, a thermal management device (e.g., a heating element or a thermoelectric element), at least one thin film battery, at least one high voltage thin film capacitor, at least one thin film electrochemical capacitor, and flexible electronic circuitry that is in electrical contact with each of the above layers. Each of these components are preferably, but not necessarily, layered in the order listed. In still other embodiments, the thermal management device includes a temperature sensor, a heater, such as one or more resistive heating elements, or a thermoelectric cooling element, or any combination of those.

In certain embodiments, the battery system is based on a thin film lithium ion polymer electrolyte battery (utilizing a carbon anode) having an energy density of at least 125 Wh/kg, or utilizes a lithium polymer electrolyte battery (with a lithium metal anode) having an energy density of at least 200 Wh/kg, that is capable of operating over a wide temperature range, including cryogenic conditions and higher temperatures, e.g., −20° C. to +150° C. or more. In fact, preferred lithium polymer electrolyte batteries operate more efficiently at higher temperatures than at room temperature. In highly preferred embodiments, the thin film solid state lithium polymer electrolyte has a conductivity greater than $1 \times 10^{-4}$ S/cm at 25° C. or below, and comprises a mixture of: (a) a base polymer material comprising at least one ionically conductive polymer and having an initial conductivity of at least $1 \times 10^{-5}$ S/cm at 25° C. when combined with a metal salt; (b) a lithium salt; (c) an inorganic filler having an average particle size less than 0.05 micron in diameter and a surface area of at least about 100 $m^2$/g; and (d) an ionic conducting material having an average particle size less than 0.1 micron in diameter and an initial ionic conductivity of at least $2 \times 10^{-3}$ S/cm at 25° C.

In preferred embodiments, the SEIPU-containing power system also contains a thermal management system for adapting the system to extreme temperature use. This can include thermal management devices such as heating elements and/or thermoelectric element, for example.

In certain embodiments, the active photovoltaic power source is on a rigid support such as stainless steel. In preferred embodiments, the active photovoltaic power source is on a flexible support such as Kapton™, polyester, polypropylene, polyvinylidene fluoride or polyethylene naphthalate.

In preferred embodiments the power system also includes one or more electronic controls, such as preprogrammed microprocessers and dc-dc converters, connected to the electronic circuitry. In some embodiments at least two photovoltaic cells are connected in series or in parallel. In some embodiments at least two of the batteries are connected in series or in parallel and are interconnected to the photovoltaic cells by the laminated electronic circuitry. In some embodiments the photovoltaic cells, batteries and capacitors are interconnected to form a single function power module, and in other embodiments they are electrically interconnected to form multi-function power modules. In some embodiments the electronic circuitry connects one or more battery layer and/or one or more capacitor layer to an electrical load, to provide either high energy or high power, as desired.

In certain embodiments the battery layer of the power unit comprises one or more cells containing a thin film amorphous carbon anode, a thin film lithium ion electrolyte gel containing a liquid organic solvent (up to 30 wt. %), and a thin film lithiated metal oxide cathode where the metal is manganese, cobalt, nickel or a combination of one or more of those metals.

In certain other embodiments the battery layer comprises at least one rechargeable thin film solid-state lithium polymer electrolyte cell that has a thin film lithium metal anode and a thin film lithium insertion cathode. In preferred embodiments the film battery has an energy density in the range of 200–250 Wh/kg. In preferred embodiments the high voltage film capacitor system is based on a thin film metallized polymer capacitors having an increased energy density over existing polymer film capacitors, and in certain embodiments the film capacitor has an energy density of at least 5 J/cc, more preferably in the range of 5–10 J/cc. The capacitor provides the high drain current as well as pulse power capabilities, which the battery may or may not be able to provide.

In certain preferred embodiments, the electrochemical capacitor system is based on high surface area carbon electrodes and either aqueous or non-aqueous electrolyte. In other preferred embodiments, the electrodes are based on battery active valve-metal oxides such as ruthenium oxide. In some embodiments, the electrodes contain 50–95 wt. % ruthenium oxide and the balance of the valve-metal oxide is vanadium oxide and is capable of supplying 1–3 volts.

In certain embodiments, the power unit is configured as, or integrated with a structural member, and comprises a solar panel containing a laminate of the following layers: at least one thin film photovoltaic cell, optionally, a thermal management device, a thin film battery, a thin film capacitor, a thin film electrochemical capacitor, electronic circuitry, another thin film capacitor, another thin film electrochemical capacitor, another thin film battery, optionally, another thermal management device, and at least one additional thin film photovoltaic cell, the layers being operationally interconnected by the electronic circuitry.

In accordance with certain embodiments, the power system includes a structural member that comprises an exterior surface of a structure, and in some embodiments the laminate is flexible. In some embodiments the laminate is substantially impervious to gaseous species, e.g., a defined gas is retained by and/or chemically benign toward a balloon formed by said laminate to a sufficient extent and for a sufficient time to allow the balloon to be used for a desired purpose. In certain other embodiments, the laminate is at least semi-rigid. In some embodiments at least some components of the laminate are resistant to thermal and electromagnetic radiation, i.e., the component does not transmit heat within that component or deteriorate when exposed to radiation. In some embodiments the thin film capacitor also serves as a radiation shield, and in some embodiments the power unit contains one or more thermally insulating materials.

In certain embodiments, the thermal management device may include a heating element to either heat the power source for functionality or to heat other devices on the spacecraft, if necessary. For example, this option will be useful when collecting cryogenic samples and heating to liquefy for storage or analysis. In certain embodiments, the thermal management device may contain thermoelectric cooling elements to keep the solar cell arrays cool while providing waste heat (resulting from the extraction of heat from the solar cells) to the battery or other parts of the structure. The thermoelectric elements would function similarly to thermoelectric-based household freezers, which keep the inside housing cool and also dissipates the extracted heat to the outside.

In addition to the many applications of the present invention to solving the energy needs for many space exploration and earth orbital operations, the present invention also overcomes many of the shortcomings of terrestrial solar power technologies now employed or previously proposed for military and non-military equipment, in both mobile and non-mobile structures. For example, certain embodiments of the new power system are also applicable to automobiles, homes, office buildings, and especially to isolated structures and those situated in remote locations.

In accordance with certain embodiments of the present invention, a vehicle is provided that includes an above-described solid-state power system in which the solid-state power unit is integral with a structural member of the vehicle, such as an exterior covering or body. In other embodiments the structural member on the vehicle is interior to the vehicle, such as a support or a truss framework. In some embodiments, the vehicle comprises a spacecraft such as a satellite, nanosat, aerobot or hot air balloon, and in some embodiments the spacecraft is designed for deep space exploration and is capable of operating under cryogenic conditions for an extended period of time. In certain embodiments, the vehicle's power system is capable of electrolyzing, compressing, liquefying or freezing a transported or atmospheric gas or of sublimating or boiling a frozen or liquid phase of an atmospheric gas. In certain embodiments the vehicle is an airborne or spaceborne platform, and in certain other embodiments the vehicle is a terrestrial vehicle.

In accordance with still other embodiments of the present invention, a structure comprising an above-described solid-state power system is provided in which the power unit is integral with a structural member of a structure, such as a residential or commercial building or a piece of equipment, especially in an isolated or remote location. In certain embodiments the structural member is flexible, and in others it is rigid or semi-rigid.

Some of the features and advantages of certain embodiments of the present invention include the following: A structurally embedded intelligent power unit (SEIPU) can provide continuous and pulse power to a spacecraft under all environmental conditions. Using a SEIPU instead of a conventional electrical power source offers a way to reduce spacecraft payload and thus, launch cost and at the same time provide a lightweight and longer lasting ultra-thin film power source. A preferred solid-state power source can be assembled that does not deteriorate (i.e., compromise to the cycle life or longevity of the battery) under extreme temperature conditions, and can offer higher cycle life than existing liquid-based systems.

In a preferred embodiment, a SEIPU comprising a rigid photovoltaic power source, a thin film high energy battery (a lithium ion or lithium polymer), a thin film high voltage metallized polymer film capacitor as the energy storage power sources, a layer of heating element, a layer of thermoelectric cooling elements, and a layer of power electronic circuitry that manages various charging and power management schemes, is embedded or is a part of the space platform or satellite to be used for anti-missile launchers, where a source of continuous power is required, but also high pulse power demands for launching missiles.

In another preferred embodiment, a SEIPU comprising a flexible photovoltaic power source, a thin film flexible lithium polymer electrolyte battery, a thin film flexible electrochemical capacitor, thermal management components comprising a heater and/or thermoelectric cooling elements interposed between the solar cells and battery, and a layer of power electronics circuitry that manages various charging and power management schemes, forms the actual flexible inflated balloon or aerobot structure that could be used for atmospheric evaluation or surveillance purposes. A preferred new solid-state power source can undergo fast-charge and discharge without any compromise on the cycle life or performance and has the ability to provide continuous power to on-board instruments and other electronic devices. By including a thermal management system (e.g., embedded heating elements, temperature sensors, and "intelligent" temperature control circuitry), a SEIPU can provide heat to either the power source itself or to predetermined instruments in cryogenic conditions. Still other features of preferred embodiments of the new power system include the ability to provide high power on demand. By careful selection of the SEIPU components and materials, protective heat and radiation shielding for the power sources are obtained without adding separate shielding elements. Another feature of some embodiments of the invention is that a flexible power source can be laminated directly onto the existing structures of a spacecraft; or, alternatively, modular panels of the power units can be readily interconnected through electrical interlocks to form larger panels.

The new power system makes possible for the first time the design and manufacture of modular, high energy power supplies that are comparatively maintenance-free, lightweight, and offer significant space savings. The preferred embodiments of the present system are self-regenerating, with no additional charging cost. A key advantage is that the preferred ultra-thin film components will allow fast-charge capability and will also provide improved charging efficiency, compared to other methods of charging. Consequently, higher cycle life is possible for prolonging satellite or other application usage, thereby reducing the requirement for frequent replacement and lowering overall cost. These and other embodiments, features and advantages of the present invention will become apparent with reference to the following description and drawings.

BRIEF DESCRIPTION OF THE DRAWINGS

FIG. 17A shows a partially rolled flexible SEIPU sheet, and FIG. 17B shows two SEIPU sheets according to FIG. 17A, rolled and unrolled, over the windows of an automobile.

DETAILED DESCRIPTION OF PREFERRED EMBODIMENTS

A lightweight, integrated structural panel solid-state power source, called a "Structurally Embedded Intelligent Power Unit" or "SEIPU," can have the shape of a balloon, nanosat, satellite, air/space platform building material, or any of a variety of other structures. For example, the laminated components of a solar power system (photovoltaic solar cells) and advanced energy storage system (batteries and capacitors) are directly embedded into the structural panels of a satellite or configured into the shape of the balloon structure, thereby increasing capacity and rate capability of the respective systems. Such features, which were previously not available simultaneously in the same satellite, allow greater latitude in power management, provide reliable power under any conditions, reduce satellite weight, and provide improved charged acceptance capability. Layers of advanced film solar cells, film batteries (with energy densities in the range 200–250 watt-hours/kilogram (Wh/kg)), film capacitors (with specific energy in the range of 5–10 Joules/cubic centimeters (J/cc)), electrochemical capacitors (with specific energy in the range of 15–100 J/cc, flexible electronics, and ancillary components such as thermal management devices (heating and cooling devices), all configured in an ultra-thin film flexible laminate design, are formed into uniform and flexible structural panels that can be shaped into the outer shell of a space device body or other structure. The outer shell would then generate power to supplement the main solar panel array. Such material will also do the same for mobile terrestrial solar power in military as well as non-military equipment such as automobiles, homes, office buildings, and especially structures situated in remote locations.

Figure 1:
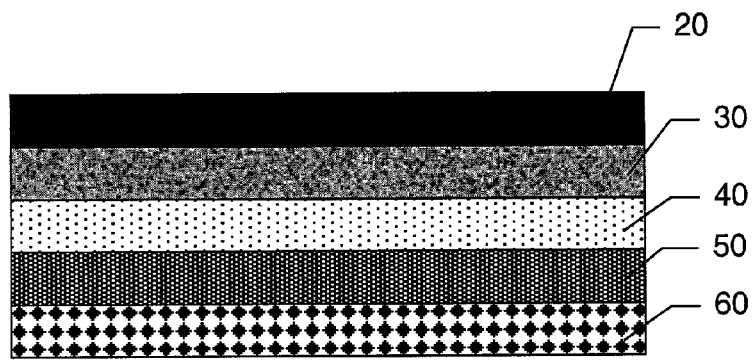
FIG. 1 is a schematic cross-sectional view of the SEIPU components according to certain embodiments of the invention.

Structurally Embedded Intelligent Power Unit (SEIPU). Referring to FIG. 1, a schematic cross-section of a preferred structurally embedded intelligent power unit (SEIPU) 10 is provided, in which the laminated components are shown. The outer layer of this SEIPU consists of the solar array 20 that may or may not have concentrators (i.e. materials or devices having the ability to concentrate the sun intensity). These solar panels are preferably mounted on Kapton™ (DuPont, Wilmington, Del.) polyimide flexible sheets or another suitable plastic substrate such as polyester, polypropylene, polyvinylidene fluoride or more preferably polyethylene naphthalate, which offers improved tensile strength and thermal properties. The second layer (underlying layer) is the flexible heater and/or thermoelectric cooling system 30 whose lining is preferably made out of polyimide. The heating means is not limited to resistive-type heating only, but can also be provided by microwave, ultrasonic, infrared or electromagnetic induction-type heating. The heater system, constituting all or part of a thermal management device, provides increased protection to the underlying battery and capacitor power sources as well as the associated electronics from space debris bombardments as well as intense heat. The thermoelectric cooler removes the heat from the solar cells, cools the solar cells for more efficient operation, and at the same time provides the removed heat to the battery. The next layer is the solid-state thin film battery 40 with high energy content. The layer under the battery is the laminated metallized film capacitor 50, which is preferably made of polyvinylidene fluoride (PVDF)-based material (as described in U.S. Pat. No. 6,426,861 and PCT Application No. PCT/US00/11883, which are hereby incorporated herein by reference) with energy densities exceeding 5 J/cc. For example, the film capacitor may comprise a thin coat of a material of high dielectric constant and relatively low electrical properties, such as PVDF, onto a capacitor grade polymer film of lower dielectric constant but higher electrical properties, such as PP, PET, PEN, PPS, PC or PTFE, or copolymers or hybrid polymers formed from such blends. The coating material thickness ranges from 0.1 micron to 25 microns, and the coated substrate thickness ranges from 0.5 micron to 25 microns. The coating can be solvent cast directly onto the polymer substrate, or vapor deposited in an atomized manner, or melt cast directly onto another melt cast substrate, or heat laminated. The coating can be applied to either MDO or TDO substrate polymer film. If an MDO substrate is used, the coated film could be stretched subsequently in the TDO direction, to achieve bi-axial direction orientation for the coating. Alternatively, the capacitor 50 is based on a thin film electrochemical capacitor (as described in U.S. Pat. No. 6,426,863 and PCT Application No. PCT/US00/32275, which are hereby incorporated herein by reference), with energy densities exceeding 100 J/cc. For example, one embodiment of a thin film electrochemical capacitor is formed from a resilient flexible polymeric electrolyte thin film that includes a base polymer with inorganic filler dispersed therein to increase surface area and porosity of the film, impregnated with a semi-liquid or even dry solution of liquid polymer, organic solvent electrolyte and a salt; and a pair of spaced-apart flexible thin film electrodes, each including a polymer substrate having an adherent electrically conductive layer of the above mentioned metallic material thereon, the polymer electrolyte film being tightly sandwiched between the pair of thin film electrodes. The polymer substrate of each of the anode and cathode is preferably selected from a group of polymers including PET, PP, PPS, PEN, PVDF and PE, and each polymer substrate is metallized to form the conductive layer thereon. The ultra thin film metallized polymer substrate has a thickness in a range from about 0.5 micron to about 50 microns, thereby rendering it very flexible for ease of coating and handling, to avoid kinking and deformation thereof, during manufacture of electrochemical capacitors. The PVDF component of the polymer film provides additional protective radiation shield to the electronic circuitry and other associated equipment within the spacecraft that may be prone to damage. Finally, the layer under the capacitor is the associated smart electronics 60 containing hybrid circuitry and temperature sensors that control the various functions of the power sources and thermal management system.

Depending on the specific requirements and variations of a particular application, the number of components and the order of application of the SEIPU layers may be different than that depicted in FIG. 1. For instance, in some cases it may be preferable to place the heating elements in the center of the stack of laminated components to better power the battery and/or the capacitor in ultra-cold conditions. Alternatively, it might in some cases be preferable to locate a heater on the surface to warm a frozen ice cap or to thaw out a balloon or robotic element. In some cases, the heat to the battery or other components is provided by the waste heat from the thermoelectric cooler that cools the solar cells. The SEIPU is preferably modular, as illustrated in FIGS. 8–14, and the components of the SEIPU can be manufactured at low cost using high-speed deposition technologies. Preferably the ultra-thin battery laminates are prepared as described in U.S. Pat. Nos. 6,645,675 and 6,664,006, and PCT International Publication Nos. WO 01/17051 and WO 01/17052, modified to include lamination of electronic circuitry and heating elements. The ultra thin high voltage metallized film capacitor laminates are prepared as described in U.S. Pat. No. 6,426,861 and PCT Application Ser. No. PCT/US00/11883, the ultra thin electrochemical capacitor laminates are prepared as described in U.S. Pat. No. 6,426,863 and PCT Application No. PCT/US00/32275. Each of these patent applications or patents are hereby incorporated herein by reference. The system may also be engineered for dual use design, i.e. serving as part of the structural panel and also serving as a power generator.

Figure 2A:
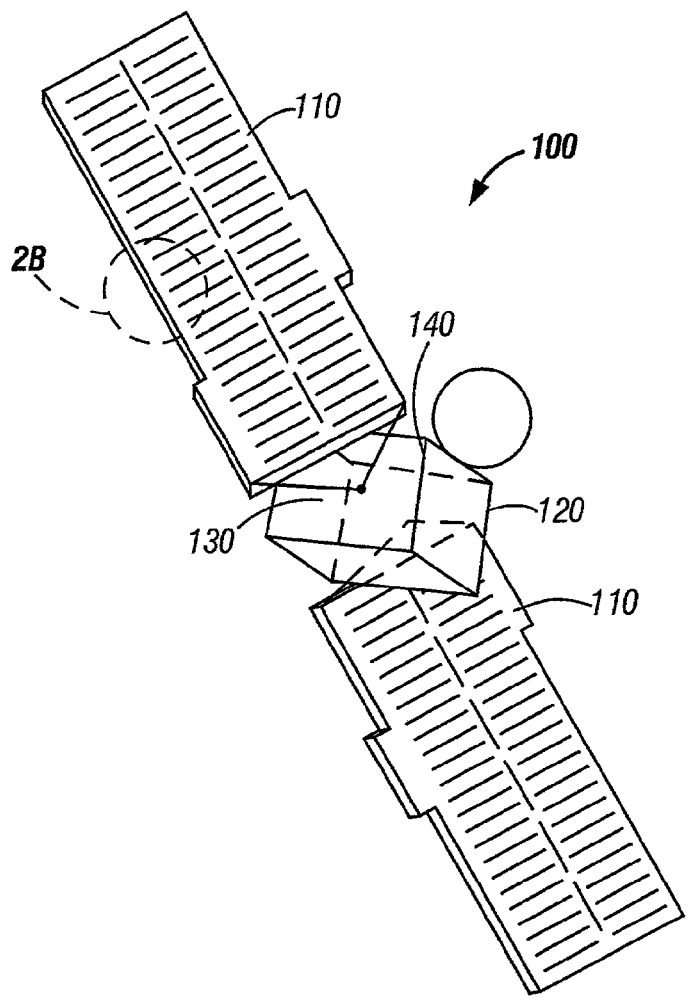
FIGS. 2A–B depict a satellite having solar panels, heaters, batteries, capacitors, and electronic circuitry, in accordance with certain embodiments of the invention.
Figure 2B:
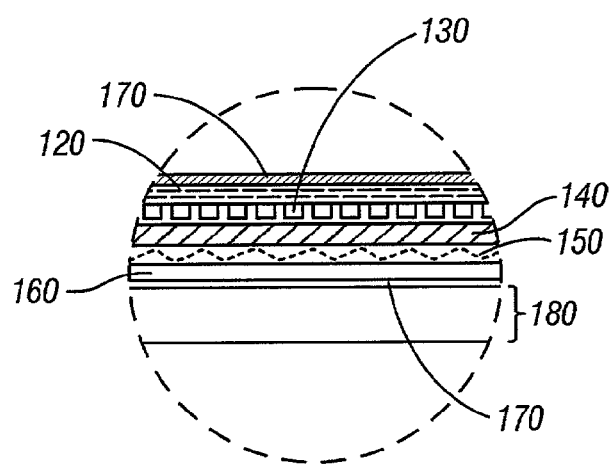

SEIPU-Powered Satellite. A drawing of a SEIPU-powered satellite 100 is shown in FIG. 2 in which the available area and placement of the SEIPU panels 110 is similar in appearance to the solar panel placement of a typical satellite in use today. A magnified cross-section of a SEIPU/solar panel shows the layers of the SEIPU, which include solar cells 120, heaters or coolers 130, battery 140, capacitor 150, electronic circuitry 160, and a mirror image repeating unit 180 disposed on the opposite side of the panels 110. A transparent protective layer 170, such as polyimide, is preferably placed over solar cells 120 on both sides of panels 110. Capacitor 150 is preferably one or more film or electrochemical capacitors, as described above. Battery 140 is preferably a solid state lithium polymer electrolyte battery, also described above.

The body 120 of a satellite can be fitted all around with these lower cost SEIPU panels 130 manufactured through a high-speed deposition process and subsequent compression molding into the truss structure 140, maximizing the utility of the space power system and allowing more useable space for other components required for fire-power. Moreover, by incorporating such thin film power modules within the structural framework as part of the satellite truss structure, the weight of the satellite can also be reduced. Embedding the power source within the structural panels also alleviates the problem of providing additional protection against heat and debris because the satellite's customary protective 'skin' will not be needed. The multi-functionality of the SEIPU allows further reduction of the satellite's weight, and by incorporating thin battery structures, the charging efficiency is expected to be greatly improved over existing rechargeable power systems. The degree of weight reduction of the power module, and hence the satellite, will vary according to the power requirement by the satellite, but will be in the range of about 60–70% on the battery and about 15% on the satellite. This is quite significant considering that launch cost is per unit of weight.

Taking the Deep Space 1 satellite as a benchmark (Table 1), it is calculated that a substitute lithium polymer electrolyte battery delivering the same amount of fixed power (2,500 W) would only weigh about 14 kg versus about 90 kg for the Ni—$H_2$ system. In addition, incorporating a metallized thin film polymer capacitor in the power module could provide the high power demand which the battery may or may not be able to provide under certain circumstances, e.g. 10 kJ (for missile applications), the polymer film capacitor would weigh an additional 3.5 kg, making a total battery/capacitor weight of 17.5 kg. This is only about 20% the weight of the Ni—$H_2$ system with room for increasing additional power. Furthermore, there is a wide degree of latitude in weight for the additional thermal management system, power management components, which should not take up more than an additional 10–15% of the weight.

Figure 3:
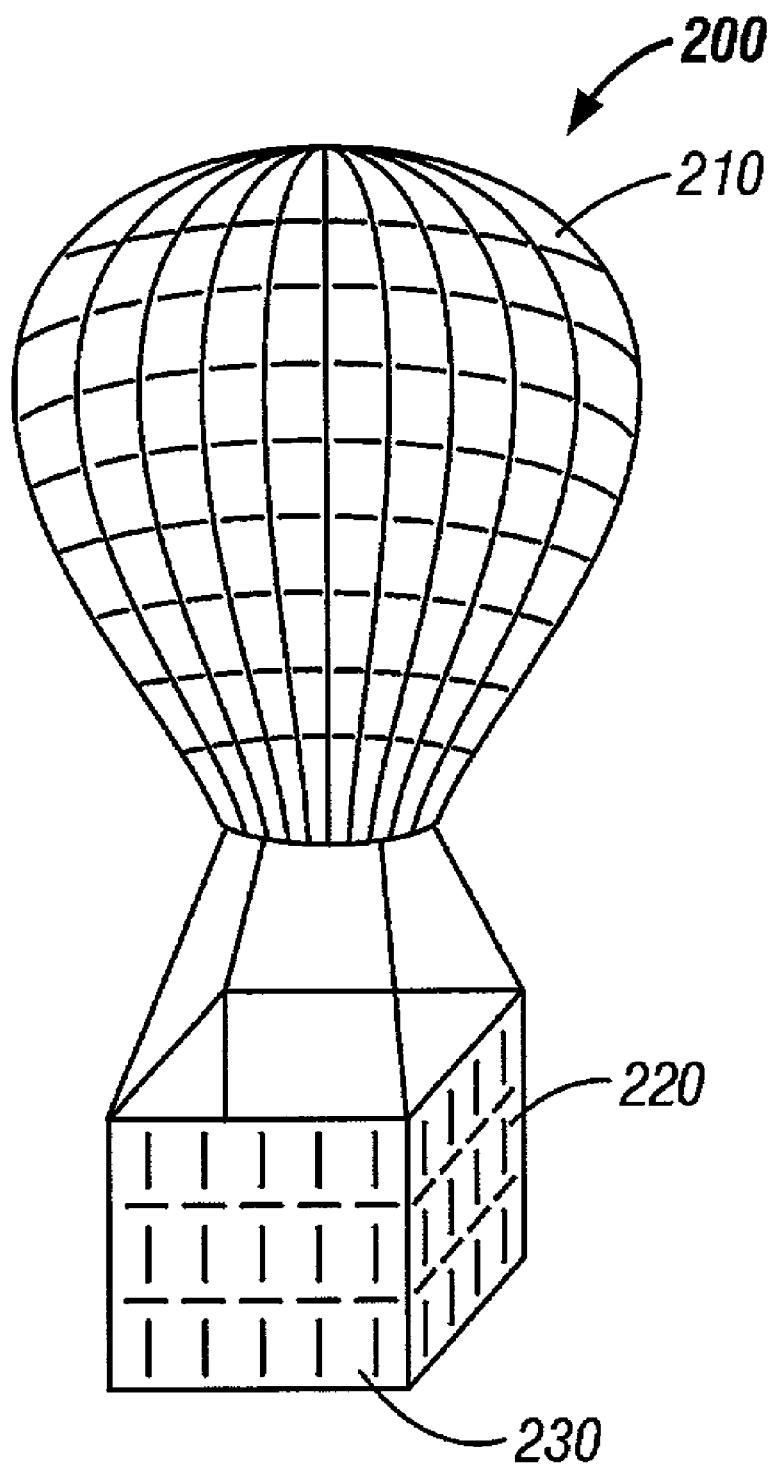
FIG. 3 is a drawing of a balloon and base structure containing flexible SEIPU panels, in accordance with some embodiments of the invention.

SEIPU-Powered Aerobot/Balloon. FIG. 3 shows a balloon structure that is similar in appearance to a conventional balloon and base structure, but whose envelope as well as the base structure is made of the SEIPU. The SEIPU could also form the envelope structure of hot-air balloon, aerobot or other housing material that are being considered for space exploration, replacing the nylon or canvas materials currently used. The heat from the hot-air can keep the battery warm and provide the necessary power for powering robots or robotic limbs to collect mineral samples or gaseous products during deep space exploration. Under cryogenic conditions where the heat from the hot-air may still not adequately warm the battery or other components of the power source, one would use the heating system of the power source.

Figure 4:
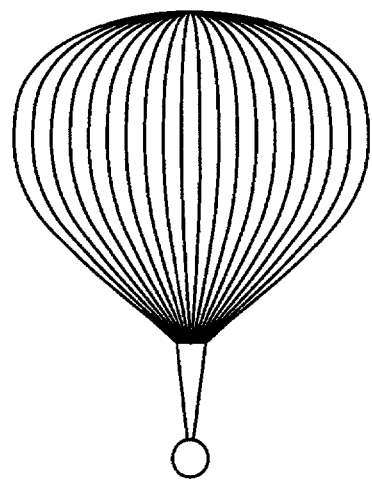
FIG. 4 is a drawing of a SEIPU-containing aerobot that is suitable for use in exploring a planetary atmosphere.

In some applications, such as an aerobot balloon, shown in FIG. 4, the spacecraft's entire structural housing would be its own self-regenerating power source. This resilient new building material, and the weight reduction its offers, would significantly improve spacecraft payloads and simultaneously increase the power capabilities and performance of the craft and its scientific instruments. The SEIPU would replace the separate photovoltaic panels previously considered for spacecraft, either entirely or partially. Not only would there be considerable weight reduction, there would also be associated cost benefits and increased cargo space, to make way for additional components of the spacecraft. For optimum feasibility, several criteria are preferably taken into account when designing and assembling a SEIPU for a particular application, including: (1) The selected power source materials are preferably very thin, lightweight and flexible and yet provide excellent protection from solar radiation, space debris and general wear and tear, when employed as an external panel or structural member. Alternatively, rigid or semi-rigid interlocking panels could be used to construct the balloon; (2) The power unit is preferably a high energy density solid-state device or one containing only limited quantities of liquid electrolytes (0–30 weight percent). The term "solid-state" is also intended to include soft or gel-like semi-solids (polymer gel electrolytes) that do not run or leak fluid when deposited as a laminated thin film; (3) The power unit should be able to be manufactured in a thin film, flexible form that can accommodate laminating of the different power source components, embedding in a plastic substrate, and lacing together to form a large surface area that is the actual self supporting structural component that satellites and balloons are built from; (4) It should provide increased energy performance at lower cost compared to adding separate batteries/capacitors and other components connected by complex wiring; (5) The SEIPU should also be rugged and provide higher power density, cycle life and long shelf life under the most severe environment; (6) The intelligent embedded electronic computer/microprocessor should be able to react to changes in the spacecraft needs such as, for example, providing charge to the battery from the solar cells or charge to the capacitor from the batteries or solar cells, or discharging the batteries or capacitors to a specific load, etc. for specific requirements; (7) Coefficient of expansion and contraction and modulus of elasticity of the materials chosen for the flexible embedded power unit should be compatible with one another; (8) The flexible, embedded power unit should be impervious to both gaseous species and radiation; (9) Fabrication of the SEIPU should be relatively straightforward with simple interconnections to integrate the power sources and components; (10) The design of the power system should be modular such that added power capability can be provided (or subtracted) for specific flights without additional engineering; (11) It should be flexible enough to be rolled up in modular sheets for a variety of portable applications; (12) A primary function of the SEIPU design is to free up precious space within the spacecraft. The SEIPU constructed as part of the balloon structure or as satellite panels should allow more available space for other components of the spacecraft needed for conducting its intended tasks; (13) For exploration involving cryogenic conditions, which may cause freezing of some of the power source system, the system should incorporate thin flexible heating elements and high voltage/high energy density film capacitors within the SEIPU. The capacitors can readily be charged from the solar panels or trickle charged from the battery, remain charged at all times, and on demand, power the heaters strategically situated within the vicinity of the batteries, to "warm up" the battery for its intended use or it can function to thaw out any frozen components of the spacecraft such as robotic limbs or provide direct burst of power for these limbs; (14) The same kind of power modules could be strategically placed within the balloon housing structure to provide continuous heat and prevent the balloon gas from condensing and contracting. In extreme cryogenic atmospheric conditions in deep space exploration, this is important for the continuation of a spacecraft's mission, such as the current Mars balloons. Similarly, the SEIPU could be used to electrolyze, compress, liquefy or freeze a transported or atmospheric gas or to sublimate or boil a frozen or liquid phase of an atmospheric gas for research purposes.

Figure 5:
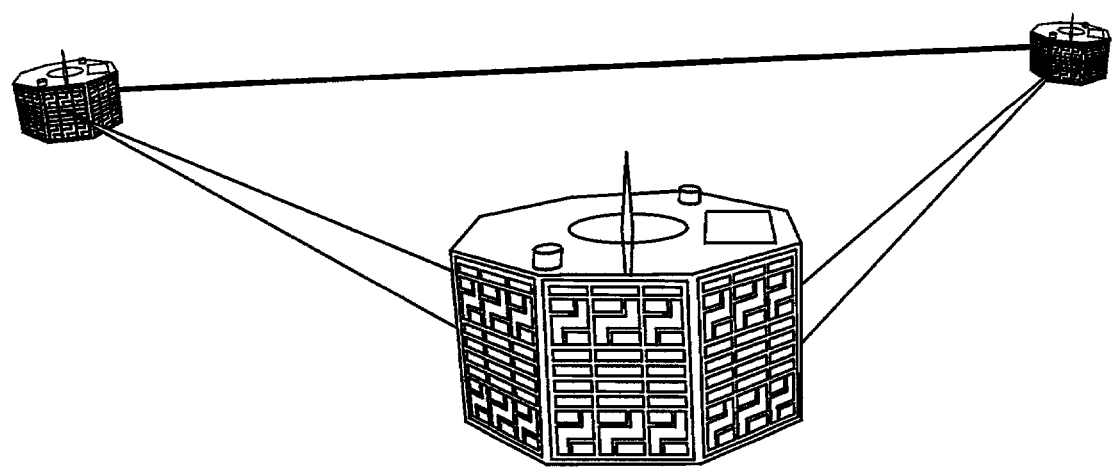
FIG. 5 is a drawing of a miniature satellite (nanosat) as modified according to certain embodiments of the present invention to include SEIPU exterior panels.

Integration of these power source components, including the electronics and thermal management devices, into a single package configured into the shape of an aerobot balloon or nanosat surface panels, as illustrated in FIG. 4 and FIG. 5, has never before been demonstrated. In non-integrated or separate form, a variety of solar cells and energy storage components are presently available from standard commercial suppliers. Customarily, the photovoltaic cells are mounted on the balloon surface/nanosat panels and the batteries/capacitors/electronics and other components are housed within the spacecraft. However, such non-integrated power systems must be specifically designed for each spacecraft, which adds to cost. By contrast, in the preferred embedded or integrated power units the components are laminated together as a large flexible sheet which can be cut to fit any conformable areas with minimal interconnections. This improved power system lends itself to cost reduction and allows more efficient utilization of available satellite area for providing the necessary power source. The energy and power availability for the satellite could be double that of an existing system, and yet be of lower mass. Furthermore, in some embodiments, the system is modular and flexible, i.e. panels can be assembled together to provide any power and voltage requirement through its intelligent electronic circuitry.

There are three principal specifications for such an integrated power system. Using an orbiting satellite as an example, and assuming that the satellite sees equal solar radiation and dark periods (although in practice solar exposure is usually higher), the first specification is to make equal power available under both sunlight and eclipse conditions. Approximately ⅓ of the solar cell power would be used by the satellite and the other ⅔ used to charge the battery. In addition, typical load profiles of this batteries/photovoltaic system cycling at tens of thousands of times will need to be considered for these daytime and nighttime operations. Second, the temperature variation would be at least −20° C. to +150° C., with possibly even greater upper and lower limits. Third, the power system weight and energy density can be estimated by the following calculations: If the energy conversion efficiency of the battery were at least 50%, which is a very conservative estimate, then the batteries would have to store about ⅔ of the solar generated energy to provide a fixed power level. The maximum efficiency for thin film solar cell modules on Kapton™ is two watts per gram and over 120 watts/m$^2$ for space insulation. Typical energy storage capacity of lithium ion batteries is about 450 Joules/gram while that for lithium polymer electrolyte batteries now in development is greater than 900 Joules/gram. The implication is that for every gram of solar cells used, only ⅓ of the solar power enters the battery. This suggests a critical need for higher energy density batteries to reduce payload.

The new SEIPU energy storage system is expected to be more than 50% efficient, with higher energy densities, so that smaller batteries could be used. In addition, the use of thin cell structures should allow higher efficiencies and cycle life. Furthermore, the incorporation of electronics and thermal management devices such as heating elements in these structures should lead to reduced payload.

Photovoltaic Cells. In addition, to "conventional" solid-state silicon solar cells, a wide range of solar cell technologies are being developed including thin film, amorphous, and tandem cells based on a variety of materials for use in concentrator, space, and terrestrial applications. Solar-to-electrical conversion efficiencies in excess of 30% have been reported, and a growing range of high surface area modules are being developed. Table 2 depicts typical cell and module efficiencies for a variety of different materials that are presently available from well known commercial suppliers.

TABLE 2

"Confirmed" Solar Cell and Module Efficiencies under Global AM1.5 Spectrum (1000 watts per square meter) at 25° C.

| System | Cell | | Module | |
| --- | --- | --- | --- | --- |
| | Efficiency (%) | Area (cm$^2$) | Efficiency (%) | Area (cm$^2$) |
| Si (crystalline) | 23.1 | 4.03 | 18.2 | 750 |
| Si (polycrystalline) | 17.3 | 4.12 | — | — |
| a-Si (thin film) | 11.5 | 1.08 | 10.2 | 903 |
| GaAs (crystalline) | 25.1 | 3.91 | — | — |
| InP (crystalline) | 21.9 | 4.02 | — | — |
| CdTe (thin film) | 15.8 | 1.05 | 8.1 | 838 |
| GaAlAs/GaAs (multi-junction) | 27.6 | 0.50 | — | — |

Although dominant in the commercial market, crystalline silicon requires energy from lattice vibrations (phonons) to induce electron movement. This is conventionally achieved by using thick crystalline silicon wafers on the order of 200 µm. Manufacturing costs are very high, so crystalline silicon wafers are used mostly for specialty applications. Two approaches have been proposed to reduce the expense of using thick crystalline silicon as an indirect bandgap material. One approach that is well-known and has been described in the literature is to use amorphous silicon, which is a direct bandgap material, not requiring the extra phonon to induce electrons to jump bands, and thus, only requiring layers a few microns thick. However, amorphous materials contain defects and suffer an initial loss in efficiency. Cell efficiency for amorphous silicon solar cells include values of 12.7% and 12.0%, respectively, for 1 and 100 $cm^2$ cells by Sanyo in 1992 and 11.5% for a Solarex cell in 1988. This type of cell module can degrade by 15–20% under 1000 hours of 1 sun illumination at 50° C., and a "stabilized" conversion efficiency of 10.2% was reported in 1994 for a 903 $cm^2$ module by United Solar Systems Corporation (S. Licht, *The Electrochemical Soc. Interface* 6(3):34–39(1997)).

A second approach to decreasing the silicon thickness retains crystalline silicon, but uses "light trapping" to compensate silicon's weak absorption by confining light to within the region where silicon is active, which obtains a long effective optical path length. This has been demonstrated recently with a 21.5% efficient 47 µm thick silicon cell of the University of New South Wales passive emitter and rear locally diffused (PERL) cell configuration. A decrease of the thickness from 400 µm to 47 µm resulted in a 10% drop in short circuit current. (S. Licht, *The Electrochemical Soc. Interface* 6(3):34–39(1997)).

Unlike silicon, cadmium telluride (CdTe) and copper indium selenide (CIS) are direct bandgap materials with bandgaps well suited to the solar spectrum. Although fewer defects occur in these devices compared to amorphous silicon, substantial recombination losses can occur at the grain boundaries of these polycrystalline devices, which diminishes cell performance. Recent advances, particularly at the National Renewable Energy Laboratory (NREL), have substantially improved CIS devices. One advance comes from varying the concentration of copper as the film is deposited. Copper and selenium initiate a temporary liquid phase in the material, permitting the growth of larger crystalline grains. A second improvement comes from the addition of gallium to the CIS, graded such that the highest gallium concentration occurs near the bottom of the film (termed a $Cu(In,Ga)Se_2$ layer or CIGS device). The resultant alloy has a bandgap better matched to the solar spectrum and the gradation produces better charge separation and lower recombination losses with conversion efficiencies reported to be 17.7%. (S. Licht, *The Electrochemical Soc. Interface* 6(3):34–39(1997)).

A limited fraction of incident solar photons have sufficient (greater than bandgap) energy to initiate charge excitation and separation within a semiconductor. Wide bandgap semiconductor solar cells are capable of generating a high photovoltage but have a low limiting photocurrent, due to the low fraction of short wavelength light in the solar spectrum. Smaller bandgap cells can utilize a larger fraction of the incident photons, but generate lower photovoltage. Multi-junction devices, also referred to as tandem, multiple window, split spectrum, and cascade solar cells, can overcome this limitation. The highest confirmed conversion efficiency for multi-junction photovoltaic at one sun is 30.3% for a 4 $cm^2$ GaInP/GaAs monolithic cell by Japan Energy in 1996. With concentrated light, the highest confirmed conversion efficiency was reported by Boeing of 32.6% at 100 suns for a 0.053 $cm^2$ GaAs/GaSb mechanical stacked cell. There are other variations of this type of design.

The current choice for solar panels on satellites now being launched is usually GaAs cells on thin Ge substrates. The cells are covered by a thin cover glass to shield against space radiation effects. This combination gives the greatest power per unit weight with very high efficiency cells (typically over 20%). However, the preferred solar cells for assembling a SEIPU employ the alternate thin film technology, CIS or CIGS on Kapton™ or PEN film and multi-junction photovoltaic cells to provide flexible panels for applications requiring flexibility or conformability.

Table 3 compares solar cell properties for "lightweight" technologies in present day production. Data is quoted for output at AM1.5 (terrestrial conditions) as that is the point of measurement for most of the entries in the table. Only cell thickness is considered for determination of power density. The efficiency of the thin film amorphous silicon cells (a-Si or a-Si:H) is certainly higher in laboratory tests and could reach 10% after allowing for initial increase (Stabler-Wronski effect) to a stable value. Thus, a-Si:H would be comparable to CIS technology. It is possible to laminate high-efficiency crystalline cells to Kapton™ foil or preferably PEN substrates and the power per unit area would be significantly increased. To store the extra energy, additional battery weight would also be required.

TABLE 3

Comparison of Key Properties of Commercialized Solar Cells.
(Efficiency and power data are for 100 mW/$cm^2$, AM1.5G, 25° C.)

| Cell Type | Cell and Substrate Thickness (mm) | Density (g/$cm^3$) | Mass per Area (kg/$m^2$) | Nominal Efficiency (%) | Area Power Density (W/$m^2$) | Specific Power (W/kg) |
|---|---|---|---|---|---|---|
| Ribbon Si | 0.120 | 2.33 | 0.280 | 11.0 | 110 | 393 |
| Cz-Si, LBG | 0.320 | 2.33 | 0.746 | 16.5 | 165 | 221 |
| Thin Cz-Si | 0.125 | 2.33 | 0.291 | 16.0 | 160 | 550 |
| GaAs/Ge | 0.100 | 5.32 | 0.532 | 21.0 | 210 | 395 |
| a-Si/Kapton ™ | 0.050 | 1.42 | 0.071 | 4.0 | 40 | 563 |
| CIS/Kapton ™ | 0.050 | 1.42 | 0.071 | 7.0 | 70 | 986 |
| CIS/Kapton ™ | 0.050 | 1.42 | 0.071 | 10.0 | 100 | 1408 |

Battery. The SEIPU battery system is preferably based on a thin film lithium ion polymer electrolyte battery (utilizing a carbon anode) having an energy density of at least 125 Wh/kg, or, more preferably, is based on a lithium polymer electrolyte battery (utilizing a lithium metal anode) having an energy density of at least 200 Wh/kg. A lithium polymer electrolyte system allows improved chemical utilization during charge and discharge, and allows high rate discharge and fast-charge capabilities, depending upon the temperature. Either battery system permits operation over a wide temperature range, including cryogenic conditions and higher temperatures, e.g., −20° C. to +150° C. or more. The lithium polymer electrolyte battery actually performs more efficiently at higher temperatures, and, as discussed in more detail below, for some applications it is preferred that the SEIPU also contain a thermal management system for extreme temperature use.

Figure 6A:
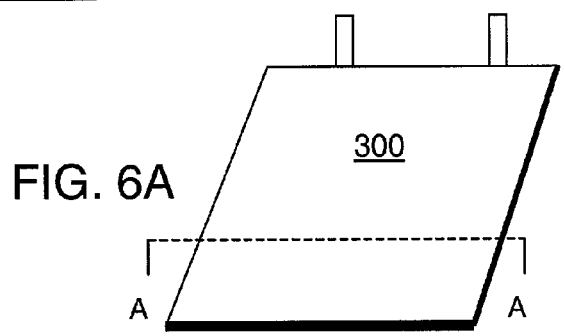
FIGS. 6A–B depict a lithium polymer electrolyte cell of a lithium polymer electrolyte battery, in accordance with certain embodiments of the present invention A is a perspective view, and B is a cross-sectional view taken along line A—A.
Figure 6B:
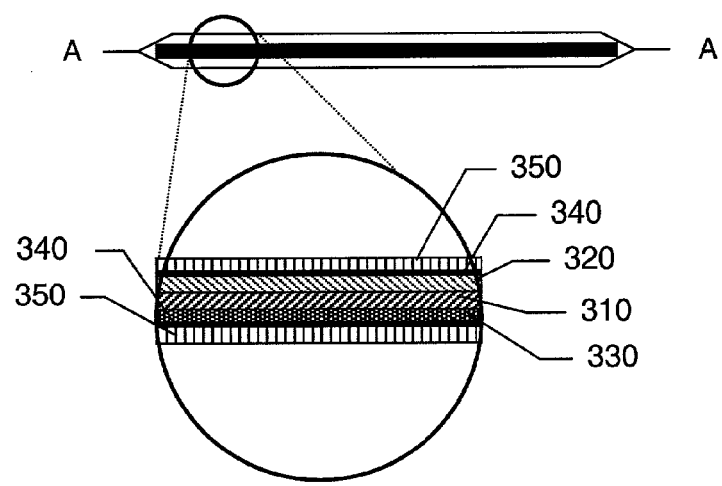

FIG. 6A is an exterior view of a lithium solid polymer electrolyte cell 300 for a battery layer 40 of a SEIPU (as shown in FIG. 1). FIG. 6B is a schematic illustration of a cross-section taken across line A—A of FIG. 6A. A thin layer of lithium solid polymer electrolyte 310 is disposed between a thin cathode layer 320 and a thin anode layer 330. Against each electrode 320, 330 is a current collector 340 comprising a thin metallized polyethylene sheet 320.

Table 4 lists the various rechargeable battery technologies either commercially available or in development.

PVDF-acrylate material with lithium imide plasticizer salt and appropriate fillers, and a manganese oxide cathode. A battery composed of such cells also provides thin film flexibility, a highly desirable feature for many applications of this technology. Another advantage is that this battery can be designed for high energy or high power or both. The single major drawback is its lower temperature performance. But its higher range is significantly better than other chemistries. A lithium solid-state polymer electrolyte battery with +15° C. as the lower operating temperature is expected to be an ideal system for an aerobot application that may experience higher temperatures and where the SEIPU may be fitted with auxiliary heaters in case the temperature drops below 15° C.

Lithium Ion Polymer Electrolyte Battery for a SEIPU. Lithium ion batteries incorporate a lithiated metal oxide cathode such as lithiated cobalt oxide and a carbon anode that can intercalate the lithium ion from the cathode during the cell reaction. A commercial system in use today utilizes a liquid organic solvent as the electrolyte absorbed in a polypropylene separator. At the present time, a few companies are using a polymer electrolyte gel membrane as the electrolyte. The use of a free-standing polymer electrolyte

TABLE 4

Characteristics of Some Rechargeable Battery Chemistries.

| Characteristics | Battery Chemistries | | | | |
| --- | --- | --- | --- | --- | --- |
| | SLA* | NiCd | Ni—MH | Li-Ion** | Li-Metal*** |
| Operating Voltage | 2 | 1.2 | 1.2 | 3.7 | 3.7 |
| Specific Energy (Wh/kg) | 35 | 40 | 60 | 150 | 250–300 |
| Energy Density (Wh/liter) | 80 | 100 | 230 | 300 | 500 |
| Cycle Life | 500 | 600 | 500 | 800 | >1000 |
| Cost ($/Wh) | 0.50 | 0.65 | 1.1 | 3 | 0.75 |
| Memory Effect | No | Yes | No | No | No |
| Self-Discharge (%/month) | 5–10 | 15–20 | 20–25 | 8 | <1 |
| Temperature Range (° C.) | −40 to 80 | −40 to 80 | −40 to 80 | −20 to 60 | 15 to 150 |
| Environmental Concerns | Yes | Yes | No | No | No |

*SLA-sealed lead acid; gelled polymer electrolyte; *dry polymer electrolyte

Both, sealed lead-acid and nickel-cadmium batteries have poor energy densities and in addition, cannot be made in thin films as desired for this program. Nickel-metal hydride used in consumer electronics applications and although relatively cheaper than lithium chemistries has lower energy and power densities.

Solid State Lithium Polymer Electrolyte Battery for a SEIPU. A solid-state lithium polymer electrolyte battery utilizing a thin film lithium metal anode deposited onto a ultra-thin metallized plastic current collector, a thin film solid polymer electrolyte with high ionic conductivity to provide adequate current drains, and a thin film cathode that can intercalate lithium ion also deposited onto a ultra-thin metallized plastic current collector form the basis for a preferred battery. Suitable all-solid-state (i.e., non liquid containing) lithium polymer electrolytes, cells and batteries are described in co-assigned copending U.S. Pat. Nos. 6,645,675 and 6,664,006, and PCT International Publication Nos. WO 01/17051 and WO 01/17052, which are hereby incorporated herein by reference. This all solid state technology is safer than any of the other lithium chemistries and has significantly improved performance over the lithium ion chemistry. For the lithium polymer electrolyte cell, it is preferable to use vacuum deposited ultra-thin film lithium metal as the anode, a solid-polymer electrolyte based on a incorporating small quantities of liquid organic solvents to enhance the low temperature performance in a lithium ion battery design offers the possibility of designing very thin film, flexible batteries which can be conformed to various shapes and sizes. Recent developments in gelled lithium ion cells (e.g., Bellcore) indicate that such cells can be manufactured in various shapes and sizes, and with improved energy densities compared to the liquid based counterparts. Among the more widespread polymers used in such a system are polyacrylonitrile (PAN); polymethylacrylonitrile (PMAN) and polyvinylidene fluoride (PVDF).

For the lithium ion cell, lithiated manganese oxide cathodes and amorphous carbon anodes with capacities of 350 mAh/gram and energy density of about 125 Wh/kg offer a cost-saving solution. Lithiated cobalt oxide has been a popular cathode in commercial lithium ion liquid electrolyte batteries because it provides high rate capabilities. A drawback of using that cobalt compound is that it is fairly expensive and scarce. By contrast, lithiated manganese oxide also has a good capacity when coupled with an amorphous carbon anode and is relatively inexpensive and plentiful in supply. By designing electrode structures in very thin film form, one can overcome the kinetic constraints that would allow for high rate charges and discharges as well as allow greater cycling efficiencies.

For the purpose of assembling a satisfactory SEIPU using either the above-described all solid state technology or the lithium ion gel battery technology, the battery also preferably includes ultra-thin film electrodes and electrolytes, and, depending on the intended use, may also incorporate ultra-thin metallized plastic current collectors.

Figure 7:
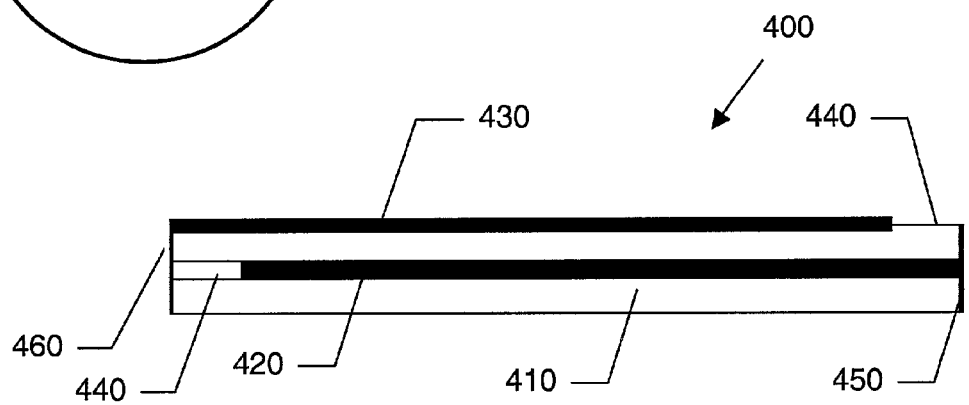
FIG. 7 is a drawing of an enlarged longitudinal cross-section of a metallized film capacitor according to some embodiments of the invention.

Capacitor. The SEIPU may contain at least one type of capacitor for high power applications. One preferred capacitor system for a SEIPU is based on a high voltage thin film metallized polymer capacitor having an increased energy density over existing polymer film capacitors, i.e., at least 5 J/cc energy density. The capacitor provides the high drain current as well as pulse power capabilities, which the battery may or may not be able to provide. FIG. 7 depicts schematically a cross-section of a preferred metallized film capacitor 400 comprising alternating thin layers of polymer dielectric 410 and metallized substrate 420. The final metallized layer 430 of the laminated stack has a narrow unmetallized margin 440 at one end 450. As shown in FIG. 5, both ends 450, 460 are schooped or end sprayed to form the termination (not shown). The capacitor is preferably a high voltage metallized film capacitor consisting of PVDF and other components to stabilize this polymer such as polypropylene or polyester as described in the U.S. Pat. No. 6,426,861 which is hereby incorporated herein by reference. A preferred embodiment incorporates a film material containing PVDF in the range 10–50 wt % with the balance being polypropylene. Other materials could be substituted for polypropylene such as polyester, polyethylene naphthalate or other dielectric polymer. The capacitor may be charged by the battery directly via a dc to dc converter. The capacitor may also provide the radiation shield necessary for the hybrid components of the electronic circuitry, while the heater and battery/capacitor components provides adequate thermal insulation to the electronics from the sun's intense heat.

A second preferred capacitor system for a SEIPU is based on a low voltage (1–3V) electrochemical capacitor technology. This incorporates two identical electrodes based on either high surface area carbon or valve-metal oxide materials and a liquid electrolyte absorbed in a separator or liquid/polymer gelled electrolyte. A preferred embodiment incorporates 50–95 wt. % ruthenium oxide and the balance a battery active material such as vanadium oxide, as described in U.S. Pat. No. 6,426,863, which is hereby incorporated herein by reference.

The optimum capacitor technology for a particular application will depend upon the choice of solar cell technology, battery technology and power availability, as well as the power required for the intended load. This is an important element in the SEIPU design because on occasions the spacecraft will require either burst of power or sustained high power, which the battery may not be able to provide.

A number of capacitor technologies already exist, ranging from low voltage/high energy density supercapacitors to moderate voltage/electrolytic capacitors to high voltage/solid-state metallized film capacitors. All of these designs are presently based on cylindrical design and are well known to those of skill in this art. The preferred, and most suitable choice, is a film capacitor and/or an electrochemical capacitor.

Figure 8:
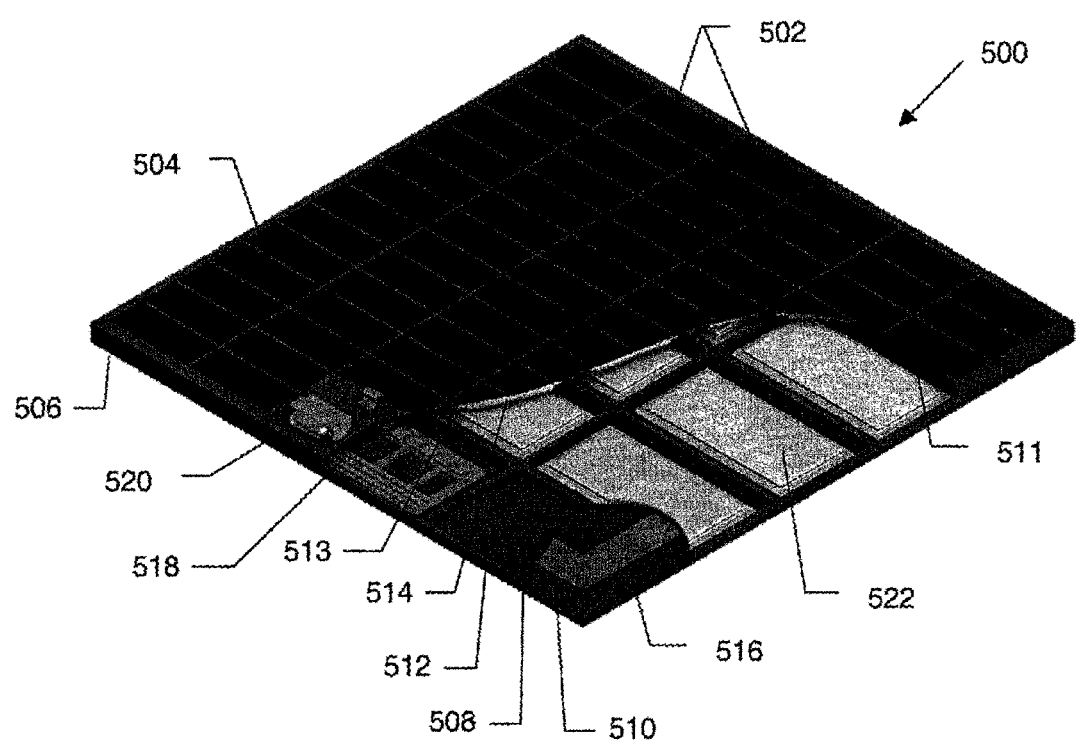
FIG. 8 is a partial cutaway view of a rigid square structural panel in accordance with an embodiment of the present invention.
Figure 9:
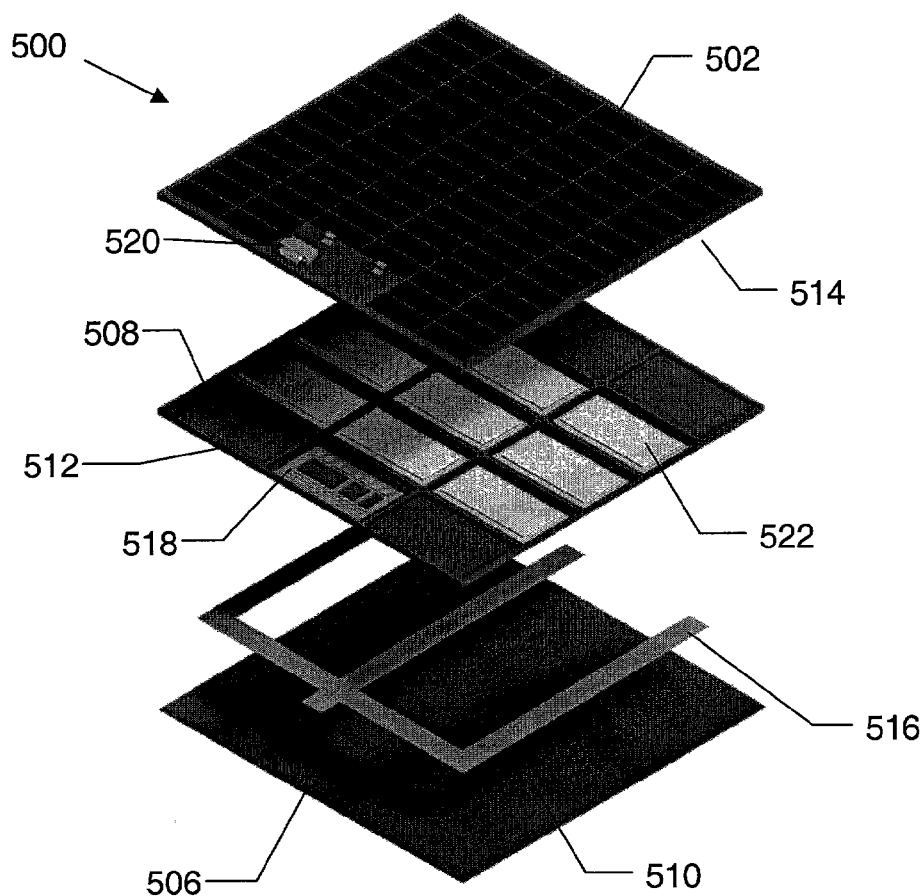
FIG. 9 is an exploded view of the structural panel of FIG. 8, showing the individual components.

Referring now to FIGS. 8–9, in one type of rigid SEIPU design that is suitable for space applications, solar panel unit 500, the solar cells 502 are located on the smooth (front or sun facing) side 504 of the SEIPU and the battery cells are located in recesses 508 in the composite substrate 512 and the interconnect electrical circuitry and heating elements (heaters) 516 are located in recesses 510 in the cover or back portion 506 of the SEIPU. The back portion 506 is preferably a composite ply. The unit also includes charge control electronics 518 and interface connector 520. The two halves (front 504 and back portion 506) are fastened together to create the integrated SEIPU. It can be readily appreciated that thermal factors (e.g., temperature control) can be important issues that need to be taken into account in this solar panel design. As depicted in FIG. 8, the battery cells 514 are alternatively, and preferably, located in pockets 513 on the underside 511 of one or more solar cells 502 to keep the battery cells 514 operating at a relatively warm temperature. However, operation of heaters 516 may be desirable or necessary to keep the battery cells warm when the unit is in eclipse. In this alternative arrangement, several capacitors 522 are located in recesses 508. FIG. 9 is an exploded view of the solar panel of FIG. 8 showing how the components are arranged and the panel is assembled according to a preferred configuration.

While it may be desirable to warm the batteries in many instances, the solar cells, by contrast, operate more efficiently when they are cold. One way to facilitate solar cell efficiency is to place a thermoelectric cooling system between the back of the solar array and the batteries so that the solar cells are kept cool and the waste heat from the thermoelectric cooler heats the battery. This alternative arrangement is similar in appearance to that shown in FIG. 8.

In still another alternative arrangement of the components in a rigid SEIPU, the pockets and cells are aligned linearly. This type of design provides another desirable modularity of the panel. For example, if the performance of the linear SEIPU is consistent with 10 W and 0.2 Ah, then five of the units could be strung together to make a 50 w/1.0 Ah system, and yet would retain the ability to be deployed individually. If higher power is needed, one could create a single 50 W/1.0 Ah system using a single SEIPU by just increasing the lengths of the battery cells, capacitors and structure without changing the width.

A preferred way of attaching the battery cells, capacitors, heaters and other components is to use any of several available space-qualified adhesives. Fastening the two structure halves (i.e., front and back cover) may also be accomplished by using fasteners and space-qualified RTV, similar to the way that electronic boxes are conventionally secured to spacecraft structures.

Figure 10:
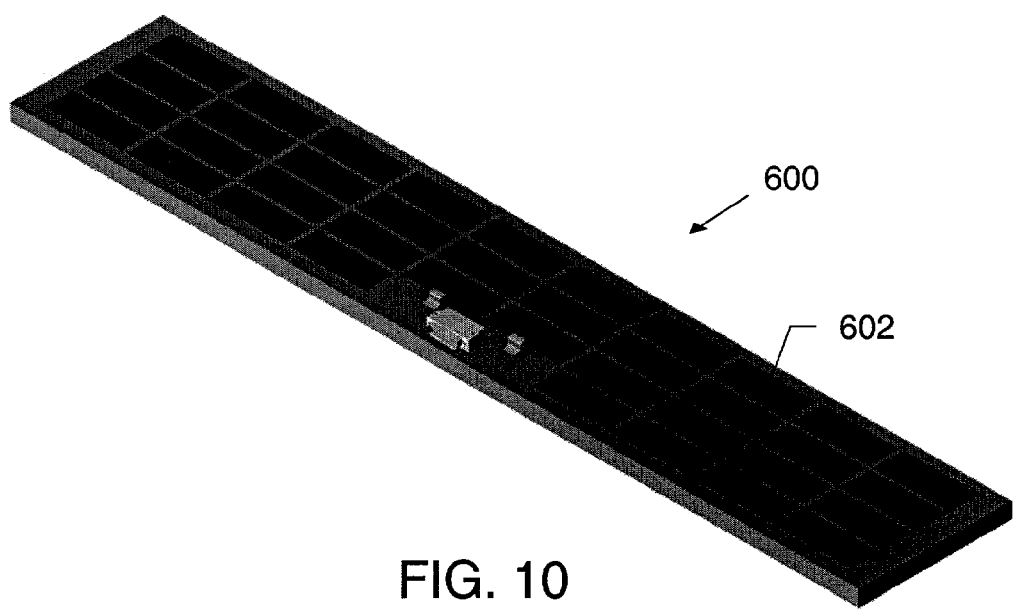
FIG. 10 shows a rectangularly designed structural panel in accordance with an embodiment of the present invention.
Figure 11:
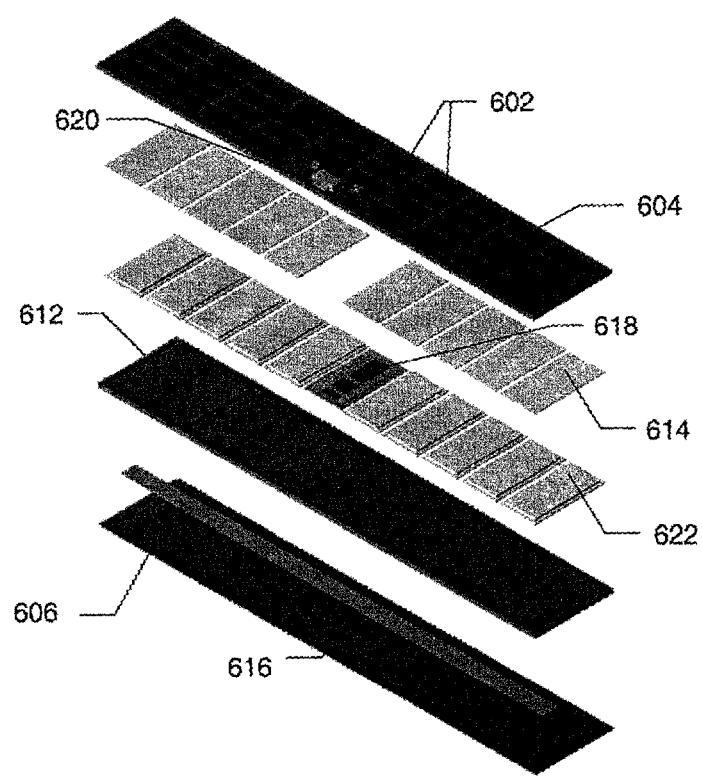
FIG. 11 is an exploded view of the structural panel of FIG. 10.

FIGS. 10 and 11 illustrate another rigid SEIPU design that is similar to that of FIGS. 8–9, but rectangular in shape. Rectangular solar panel unit 600 includes solar cells 602 located on the front 604 of the SEIPU, battery cells 614, composite substrate 612, electronic circuitry and heaters 616 cover or back portion 606 of the SEIPU. The unit also includes capacitors 622, charge control electronics 618, interconnect circuitry and heating elements 616, and interface connector 620. FIG. 11 is an exploded view of the solar panel of FIG. 10 showing how the components are arranged and the panel is assembled in one design configuration. As discussed above, with respect to the square SEIPU panel design, the arrangement of the components can be varied according to particular use requirements.

Figure 12:
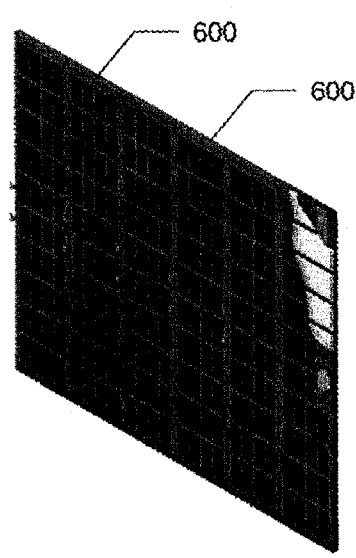
FIG. 12 shows several of the panels of FIG. 10 joined together to form a panel array, in accordance with an embodiment of the present invention.
Figure 13:
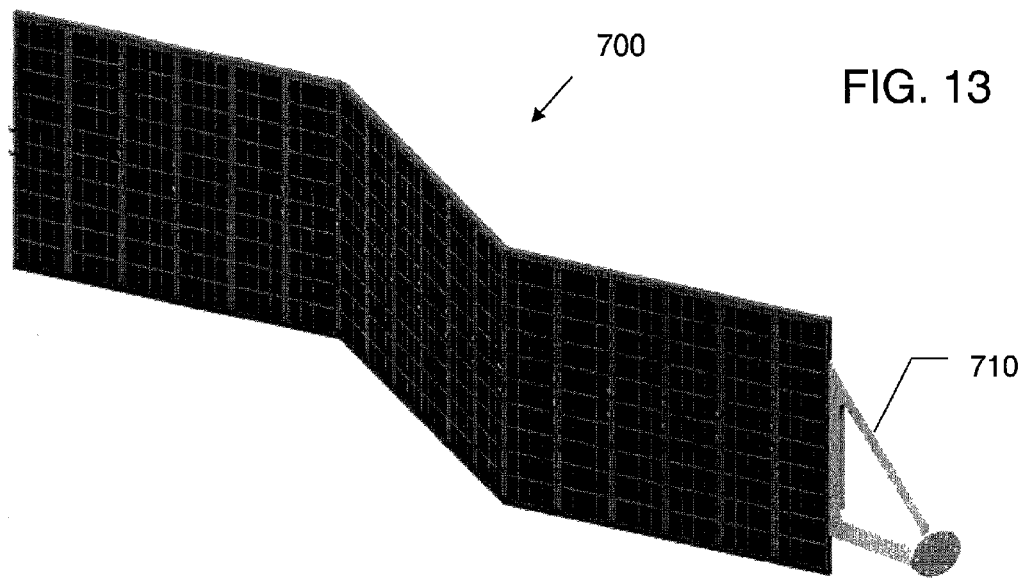
FIG. 13 illustrates a still larger array formed by joining together several of the panel arrays of FIG. 12.
Figure 14:
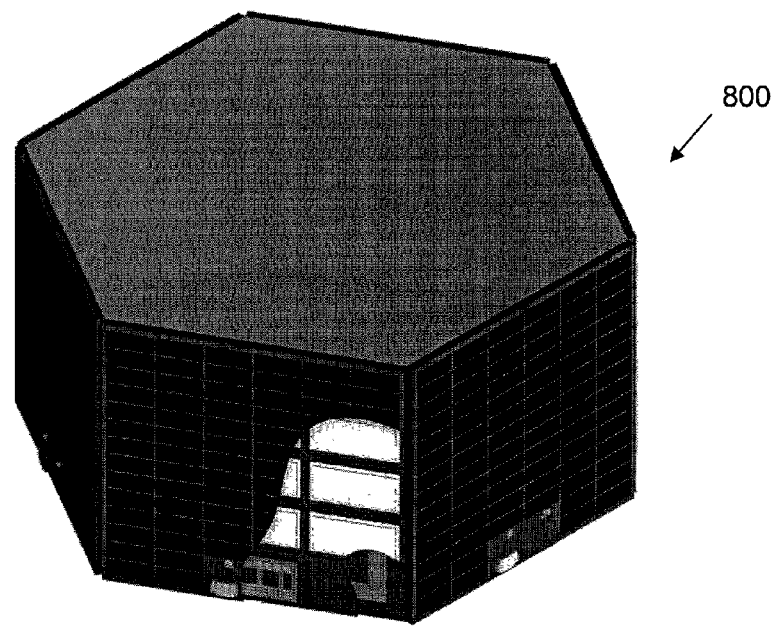
FIG. 14 depicts a spacecraft housing in accordance with an embodiment of the invention, formed by joining together the structural panels according to FIG. 13.

Referring now to FIG. 12, several of these rectangular panels may be connected together to form a larger array of solar panels. In this view, the solar cell layer of one of the panels is shown partially cut away to reveal the interior components of the panel. Such arrays can be used in constructing the satellite shown in FIG. 2, for example. FIG. 13 illustrates another way that the solar panel array modules of FIG. 12 can be joined together in array 700, includes a mounting bracket 710 for attaching the array to another structure. FIG. 14 depicts a hexagonal-walled housing 800 formed by joining together a group of the SEIPU solar panels like those shown in FIGS. 8–9 and is suitable for use in the construction of a spacecraft such as the miniature satellite or nanosat shown in FIG. 5.

Electronic Circuitry. An indicated above, the SEIPU preferably includes electronic control circuits that, depending on the particular application, (a) interconnect solar cells in series or in parallel; (b) connect the solar cells to the batteries which are also wired in series or in parallel; (c) connect the solar cells and batteries and/or capacitors in single modules or split modules for different functions, via dc-dc converters; and (d) connect the batteries and capacitors to the load. A significant body of data exists on electronic circuits to interconnect solar cells and batteries and loads for terrestrial and space applications, but there appear to be no reports in the literature describe circuitry connecting solar cells to capacitors and connecting batteries to capacitors for spacecraft applications.

Figure 15:
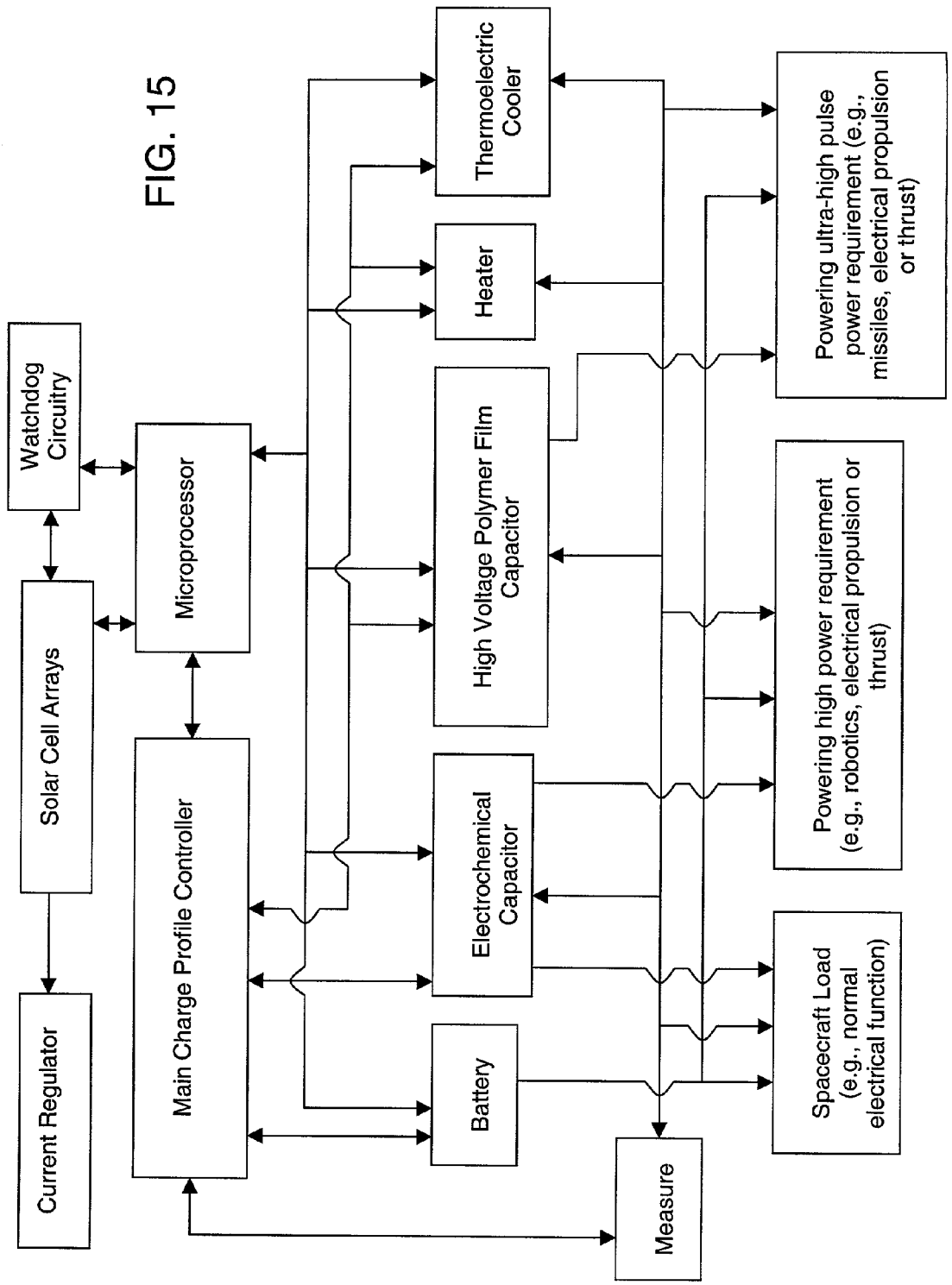
FIG. 15 is a block diagram illustrating one embodiment of the electronic control circuitry for a satellite panel containing an embedded SEIPU.

The electronic circuitry of the SEIPU can have many controlling functions, and it is within the level of skill of one with experience in this field to design appropriate electronic circuitry for a particular application. For example, as shown in the block diagram in FIG. 15, the electronic circuitry and controls can serve to charge the battery at all times from the solar panels, or in some cases, can also provide power to the heater from the solar panels. The heater may serve dual purposes, the first of which is to provide heat to the battery when required (for example in cryogenic conditions) through direct power from the solar panels. Depending upon the temperature of the environment, the battery may or may not be able to provide sufficient current drain to the instruments and hence, the heater needs to warm the battery. The battery would then begin to operate for the intended function, e.g., powering instruments or robotics, charging the capacitor, or providing some other electrical function. Once the battery is discharging, the internal resistance from the battery will then keep the battery warm, and power from the solar panels to the heater can then be switched to the battery to keep it under charge. That is, while the battery power is being consumed to power the instruments, the solar panels are simultaneously replacing part of the power consumed back into the battery. Under normal sunlight conditions, the sun's heat would keep the battery at a reasonable ambient temperature to function and there would not be any need for the heater to be used. The second purpose of the heater is that its components (e.g., metal wires) also provide an additional shield to the battery, capacitor and associated electronics from the space debris. This secondary function will, at least in some cases, obviate the need for the additional skin or enclosure materials presently used in spacecraft.

The electronic circuitry may also power a thermoelectric cooler system that will keep the solar cells cool while providing the waste heat it extracts to the battery or other desired components. It may also charge the electrochemical capacitor, if incorporated, either from the solar cell or battery. The electronic circuitry may also control the charging of the high voltage metallized polymer film capacitors via a dc to dc converter from either the solar panels or the battery for high power applications, thereby alleviating the high power use from the battery itself. This would allow the battery to drain at normal current levels and enhance the cycle life of the cell. The electronics also manages the discharge of the capacitors for either medium discharge or high pulse power discharge. The electronic circuitry also controls the charge and discharge voltage levels of the battery and prevents it from either overcharge or overdischarge. It also functions to maintain full charge on the battery at all times and controls the charging current depending upon the temperature of the battery. Higher currents are tolerated in a warm battery than in a cold battery. Under these conditions, battery polarization is minimized. In adapting the "intelligent" electronic circuitry to a particular application, the primary considerations are assuring reliability and maximizing energy recovery. Over an extended period of time these circuits must cope with, for example, differences between cell output voltage and battery charging voltage; whether the capacitor is being charged by the battery or the solar cells or both; outright faults (failures) of some solar cells; reduced performance of the cells; provision of power during nighttime; failures and/or reduced performance of battery and capacitor modules; differences between desired load and battery/capacitor output voltage, and other issues associated with the intended application.

Differences between the solar cell output and the battery charging voltage are normally covered by wiring cells in series to increase the output voltage (and reduce the current which is desirable). This high voltage is then adjusted by a dc-dc converter to the optimum for battery charging. Typically, only one converter (plus backup) is used per system. These electronic modules also adjust the power drawn from the photovoltaic array so that the cells are operated at the maximum power point. If the output current drawn from the solar cell array is below optimum, the voltage rises a small amount and the total power recovered is less than the peak available. If the current drawn from the array is too great, the voltage drops very quickly and the power recovered is less than optimum. As the voltage output of the array varies with time (aging) and other factors, this control system to maximum recovered power is an active circuit, microprocessor-controlled in newer models.

For an integrated, low cost system, only a limited number of microprocessors can be included in the electronic circuitry, in which case the recovered power will be less than optimum for assuring reliability of the system. The batteries and/or capacitors are preferably directly wired to the solar cell panel without active voltage control, but with blocking and shunt diodes for protection. Design of the wiring scheme is preferably optimized with these considerations in mind, such that when the solar panel is in shadow, these diodes prevent discharge of the battery through a reversed biased diode.

A microprocessor controlled regulator circuit will be used between the battery and the load(s) in the more preferred embodiments of the SEIPU. The circuit will deliver constant voltage and prevent draining of the battery in case of a shorted load. The power supply is modular, and the number of such controllers will be a design question that depends on the intended use. Also, interconnection of these controlled outputs will be part of the design.

Solar cell efficiency at end-of-life (EOL) is an important factor. Initial values can be severely degraded by radiation effects, thermal cycling, and other effects. In low earth orbit, the output of silicon cells with a thin front cover slip can drop by a factor of two in seven years. It is possible for these cells to survive with very thin cover slips, but they needed intermittent annealing. It is not known if CIS cells will be heavily damaged by the same radiation flux. Polyimide films such as Kapton™ are more radiation-tolerant than other polymers. This feature, in combination with superior mechanical properties, makes Kapton™ the thin film of choice for mechanical support of the module. Kapton™ is conventionally employed as support for flexible heating elements and typically demonstrates good thermal stability. An alternative low-cost thin film that also provides satisfactory radiation resistance and flexibility is fluoropolymer.

Figure 16:
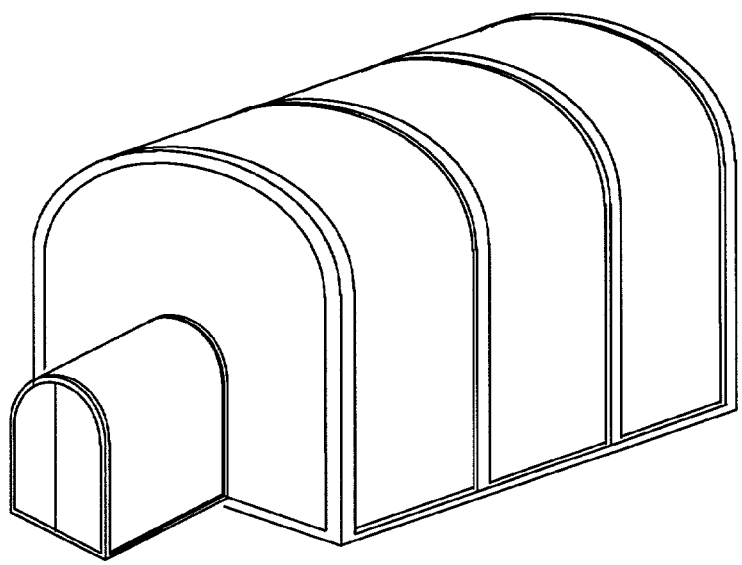
FIG. 16 is a conceptual drawing of a building, the structural members of which has been modified to include a structurally embedded intelligent power unit according to certain embodiments of the present invention.

Additional SEIPU Applications. In some cases a spacecraft's body can be fitted all around with SEIPU panels, thereby cutting major construction costs, maximizing space power and allowing more useable space for other components required for space exploration. The technology may also find use in the battlefield for powering the military equipment either on the ground or carried by the soldier or for general reconnaissance aircraft and stealth bombers. Tents or other portable prefabricated buildings used by the military (e.g., a Quonset™ type structure) could be made entirely or partly out of flexible sheets of SEIPU, as illustrated in FIG. 16, to provide lighting and powering equipment. Rolled-up modular sheets of the SEIPU could be made available for a number of applications requiring power either for civilian use or military use in remote areas of the world where sunlight is readily available.

Figure 17A:
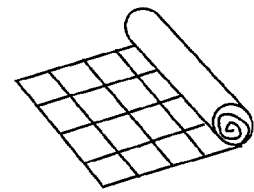
FIGS. 17A–B illustrate conceptually how an automobile is modified to include a SEIPU according to certain embodiments of the present invention.
Figure 17B:
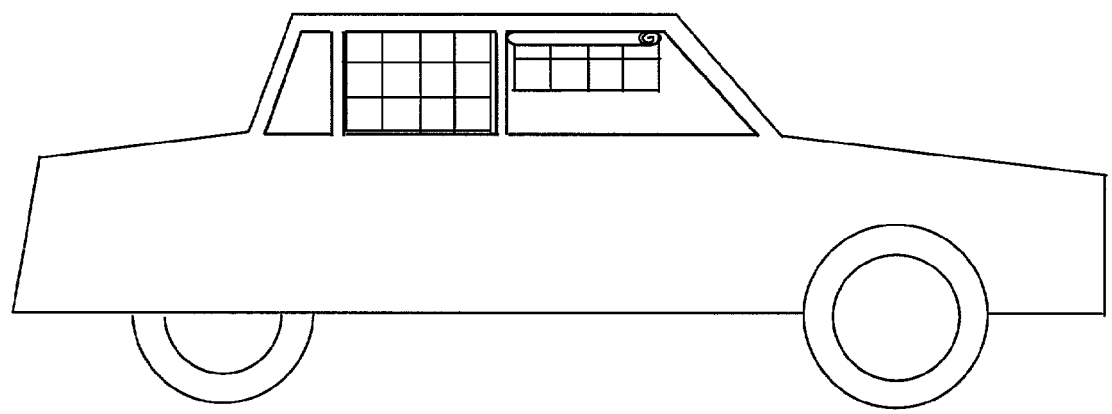

Still other applications for SEIPUs range from constructing sails (both sides) of sailboats to pleasure crafts; designer clothing for wearable computers where the clothing would be constructed from the SEIPU to provide power for cell phones and other devices; roll-up video screens (display screens) for military and commercial usage; roof coverings for homes, water towers, oil tanks, and various other structures in locations where electricity is scarce; roll-up automobile shades (illustrated in FIG. 17) or windows for an electric car containing dual roll-up windows, one made of glass and the other made of the SEIPU structure which can be used to provide supplemental power to the car; structural components of electric vehicles; and kites for observation, surveillance, aerial photography, or remote sensing purposes. A wearable solar recharger could be quite advantageous as military personnel and civilians rely more and more on batteries for smaller size mobile devices like pagers and cell phones and wireless web. Such "mini-modules" may consist of solar cells, batteries, capacitors, heaters and embedded electronics all mounted in Kapton™ film, with an outer jacket also made of Kapton™ or some other desirable radiation resistant material. Larger power systems might include a number of mini-modules all mounted on one polyimide sheet.

While the preferred embodiments of the invention has been shown and described, modifications thereof can be made by one skilled in the art without departing from the spirit and teachings of the invention. The embodiments described herein are exemplary only, and are not limiting. Many variations and modifications of the invention and apparatus disclosed herein are possible and are within the scope of the invention. Accordingly, the scope of protection is not limited by the description set out above, but is only limited by the claims which follow, that scope including all equivalents of the subject matter of the claims. All patents, patent applications and publications referred to in this application are incorporated herein by reference to the same extent as if each was specifically indicated as being incorporated by reference and to the extent that they provide materials and methods not specifically shown.

What is claimed is:

1. An electrical power system for a spacecraft, vehicle or building, said system comprising:
   a structural member of a spacecraft, vehicle or building to be powered by the system, said structural member selected from the group consisting of structural panels, housings, coverings, supports and trusses and containing at least one integral solid-state power unit, each said power unit comprising a solar power device and an energy storage device, said power unit including a laminate comprising:
   at least one film photovoltaic cell,
   at least one thermal management device that is additional to any other components of the system;
   at least one lithium battery having an energy density of at least 125 Wh/kg,
   optionally, at least one polymer film capacitor,
   optionally, at least one film electrochemical capacitor, and
   electronic circuitry in electrical contact with said at least one photovoltaic cell, thermal management device and lithium battery, and polymer film capacitor, if present, and film electrochemical capacitor, if present.

2. The power system of claim 1 wherein said laminate comprises said at least one photovoltaic cell, thermal management device, battery, polymer film capacitor; and film electrochemical capacitor, layered in the order stated.

3. The power system of claim 2 comprising at least one electronic control in electrical contact with said electronic circuitry.

4. The power system of claim 3 wherein at least one said electronic control comprises a preprogrammed microprocessor.

5. The power system of claim 4 wherein at least one said electronic control comprises a dc-dc converter.

6. The power system of claim 1 wherein said electronic circuitry electrically interconnects at least two said photovoltaic cells in series or in parallel.

7. The power system of claim 1 wherein at least two said batteries are connected in series or in parallel and said electronic circuitry electrically interconnects said photovoltaic cells to said batteries.

8. The power system of claim 1 wherein said electronic circuitry electrically interconnects said photovoltaic cells to said batteries, and, if said at least one polymer film capacitor and/or at least one film electrochemical capacitor is present, interconnects said batteries to said at least one capacitor, to form a single function power module.

9. The power system of claim 1 wherein, said at least one polymer film capacitor and/or said at least one film electrochemical capacitor is/are present, and said electronic circuitry electrically interconnects said photovoltaic cells to said batteries, and interconnects said batteries to said at least one capacitor, to form a multi-function power module.

10. The power system of claim 1 wherein said electronic circuitry connects said at least one battery and/or said at least one capacitor, if said at least one polymer film capacitor and/or said at least one film electrochemical capacitor is present, to a defined electrical load.

11. The power system of claim 1 wherein each said thermal management device comprises at least one heating element.

12. The power system of claim 1 wherein each said battery comprises at least one electrochemical cell containing a film amorphous carbon anode, a film lithium ion polymer electrolyte gel containing a liquid organic solvent, and a film lithiated metal oxide cathode.

13. The power system of claim 12 wherein said metal oxide is chosen from the group consisting of the oxides of manganese, cobalt and nickel, and combinations thereof.

14. The power system of claim 12 wherein said film lithium ion polymer electrolyte gel contains no more than about +wt % liquid organic solvent.

15. The power system of claim 1 wherein said battery comprises an electrochemical cell containing at least one solvent-free solid state lithium polymer electrolyte cell.

16. The power system of claim 15 wherein said solvent-flee solid state lithium polymer electrolyte has a conductivity greater than $1 \times 10^{-4}$ S/cm at 25° C. or below, and comprises a mixture of: (a) a base polymer material comprising at least one ionically conductive polymer and having an initial conductivity of at least $1 \times 10^{-5}$ S/cm at 25° C. when combined with a metal salt; (b) a lithium salt; (c) an inorganic filler having an average particle size less than 0.05 micron in diameter and a surface area of at least about 100 $m^2/g$; and (d) an ionic conducting material having an average particle size less than 0.1 micron in diameter and an initial ionic conductivity of at least $2 \times 10^{-3}$ S/cm at 25° C.

17. The power system of claim 15 wherein each said cell comprises a film lithium metal anode and a film lithium insertion cathode.

18. The power system of claim 1 wherein each said film battery has an energy density at least in the range of about 200–250 Wh/kg.

19. The power system of claim 1 wherein said at least one polymer film capacitor is present and each said polymer film capacitor has an energy density at least in the range of about 5–10 J/cc.

20. The power system of claim 1 wherein said at least one film electrochemical capacitor is present and comprises at least one high surface area carbon electrode and an aqueous or non-aqueous electrolyte.

21. The power system of claim 1 wherein said at least one film electrochemical capacitor is present and is capable of supplying 1–3 volts.

22. The power system of claim 1 wherein said at least one film electrochemical capacitor is present and comprises at least one electrode containing a valve-metal oxide.

23. The power system of claim 22 wherein said valve-metal oxide contains 50–95 wt. % ruthenium oxide and the balance is vanadium oxide.

24. The power system of claim 1 wherein said structural member comprises a solar panel containing electronic circuitry laminated between two power units, each said power unit comprising:
   at least one film photovoltaic cell,
   a thermal management device,
   at least one lithium battery,
   at least one polymer film capacitors and
   at least one film electrochemical capacitor.

25. The power system of claim 24 wherein said laminate comprises, in the order given:
   at least one film photovoltaic cell,
   a thermal management device,
   at least one battery,
   at least one polymer film capacitor,
   at least one film electmochemical capacitor,
   electronic circuitry,
   at least one polymer film capacitor;
   at least one film electrochemical capacitor,
   at least one lithium battery,
   a thermal management device, and
   at least one film photovoltaic cell.

26. The power system of claim 1 wherein said laminate is conformable to a predetermined three-dimensional shape.

27. The power system of claim 1 wherein said laminate is flexible.

28. The power system of claim 1 wherein said laminate is substantially impervious to gaseous species.

29. The power system of claim 1 wherein said laminate is at least semi-rigid.

30. The power system of claim 1 wherein said laminate is resistant to thermal and electromagnetic radiation.

31. The power system of claim 1 wherein said solid-state power unit is embedded in said structural member.

32. The power system of claim 1 wherein said structural member comprises an exterior surface of a spacecraft, vehicle or building.

33. The power system of claim 1 wherein said structural member is an interior support of a spacecraft, vehicle or building and said solid-state power unit is conformable to the shape of said structural member.

34. The power system of claim 1 wherein said solid-state power unit is laminated onto a structural member of a spacecraft, vehicle or building.

35. The power system of claim 1 wherein said solid-state power unit provides structural support for said structure.

36. The power system of claim 1 wherein said structural member comprises a structural panel of a satellite.

37. The power system of claim 1 comprising at least two electrically interlockable modular panels.

38. The power system of claim 1 wherein said at least one thermal management device comprises a temperature sensor.

39. The power system of claim 38 wherein said at least one thermal management device further comprises a heating element and/or a thermoelectric cooling element.

40. The power system of claim 1 wherein said at least one polymer film capacitor is present and also serves as a radiation shield.

41. The power system of claim 1 wherein said solid-state power unit comprises at least one thermally insulating material.

42. The power system of claim 1 wherein said battery and said at least one polymer film capacitor, if present, and/or said at least one film electrochemical capacitor, if present, are operational at a temperature of about −20° C. to about +150° C.

43. A vehicle comprising the solid-state power system of claim 1 wherein said solid-state power unit is integral with a structural member of said vehicle.

44. The vehicle of claim 43 chosen from the group consisting of satellites, nanosats, aerobots, balloons, high altitude or space platforms, terrestrial vehicles and boats.

45. The vehicle of claim 43 wherein said solid-state power unit comprises at least one operationally interconnected laminate containing:
   at least one thin film photovoltaic cell layer,
   at least one layer containing a thermal management device,
   at least one thin film lithium battery layer, each said battery being capable of a multiplicity of discharge/recharge cycles,
   optionally, at least one film capacitor layer,
   optionally, at least one film electrochemical capacitor layer, and
   electronic circuitry.

46. The vehicle of claim 43 wherein said thermal management device comprises at least one heating element and said power unit is capable of operating under cryogenic conditions.

47. The vehicle of claim 46 wherein said solid state power system is capable of electrolyzing, compressing, liquefying or freezing a vehicle-transported gas or of electrolyzing, compressing, liquefying, freezing, sublimating or boiling a frozen or liquid phase of an atmospheric gas comes into contact with said vehicle when said vehicle is used for its intended purpose.

48. The vehicle of claim 43 wherein said power unit is capable of operating for up to about 15 years.

49. A spacecraft, vehicle or building comprising the power system of claim 1 wherein said at least one power unit is integral with a structural member of said spacecraft, vehicle or building.

50. The structure of claim 49 wherein said structural member is flexible.

51. The structure of claim 49 wherein said structural member is at least semi-right.

52. The power system of claim 1 wherein each said thermal management device comprises at least one thermoelectric cooling element.

* * * * *